United States Patent
Okayama et al.

(10) Patent No.: US 12,471,820 B2
(45) Date of Patent: Nov. 18, 2025

(54) DROWSINESS DETERMINATION SYSTEM AND DROWSINESS DETERMINATION METHOD

(71) Applicant: Panasonic Intellectual Property Management Co., Ltd., Osaka (JP)

(72) Inventors: Motoyuki Okayama, Osaka (JP); Yu Nakashima, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 201 days.

(21) Appl. No.: 18/368,660

(22) Filed: Sep. 15, 2023

(65) Prior Publication Data

US 2024/0000355 A1  Jan. 4, 2024

Related U.S. Application Data

(63) Continuation of application No. PCT/JP2022/000177, filed on Jan. 6, 2022.

(30) Foreign Application Priority Data

| Mar. 22, 2021 | (JP) | 2021-047820 |
| Jul. 29, 2021 | (JP) | 2021-124177 |

(51) Int. Cl.
| *A61B 5/18* | (2006.01) |
| *A61B 5/00* | (2006.01) |
| *A61B 5/11* | (2006.01) |

(52) U.S. Cl.
CPC ............. *A61B 5/18* (2013.01); *A61B 5/1103* (2013.01); *A61B 5/1116* (2013.01);
(Continued)

(58) Field of Classification Search
CPC ....... A61B 5/18; A61B 5/1103; A61B 5/1116; A61B 5/6802; A61B 5/7455; A61B 5/746;
(Continued)

(56) References Cited

U.S. PATENT DOCUMENTS

| 2003/0142041 A1* | 7/2003 | Barlow | A61B 3/113 345/8 |
| 2005/0046584 A1* | 3/2005 | Breed | B60N 2/02246 340/13.31 |

(Continued)

FOREIGN PATENT DOCUMENTS

| JP | 2010-128649 | 6/2010 |
| JP | 6516187 | 4/2019 |

(Continued)

OTHER PUBLICATIONS

International Search Report issued in International Patent Application No. PCT/JP2022/000177, dated Mar. 22, 2022, along with an English translation thereof.

(Continued)

*Primary Examiner* — Ryan W Sherwin
(74) *Attorney, Agent, or Firm* — Greenblum & Bernstein, P.L.C.

(57) ABSTRACT

A drowsiness determination system includes a first acquirer, a second acquirer, a third acquirer, and a determiner. The first acquirer acquires vibration information indicating the vibration of a vehicle. The second acquirer acquires head information indicating a variation in the movement of the head of an occupant. The third acquirer acquires sitting height information indicating the sitting height of the occupant. The determiner determines whether the occupant is drowsy based on the head information and the sitting height (Continued)

information, when the vibration information indicates the occurrence of the vibration of the vehicle.

18 Claims, 10 Drawing Sheets

(52) U.S. Cl.
CPC .......... *A61B 5/6802* (2013.01); *A61B 5/7455* (2013.01); *A61B 5/746* (2013.01)

(58) Field of Classification Search
CPC ....... A61B 5/1128; A61B 5/163; A61B 5/162; A61B 5/4887; A61B 5/7267; A61B 5/7275; A61B 5/7282; A61B 2503/22; A61B 2562/0219; A61B 5/0077; A61B 5/6893; B60K 28/06; B60W 40/08; G06V 20/597; G08G 1/16
See application file for complete search history.

(56) References Cited

U.S. PATENT DOCUMENTS

| | | | |
|---|---|---|---|
| 2013/0002417 A1 | 1/2013 | Akiyama et al. | |
| 2015/0105976 A1* | 4/2015 | Shikii | B60W 40/08 701/36 |
| 2017/0021836 A1 | 1/2017 | Mochizuki et al. | |
| 2017/0140232 A1 | 5/2017 | Banno et al. | |
| 2022/0027646 A1* | 1/2022 | Giralt | G08B 29/188 |
| 2022/0203995 A1* | 6/2022 | MacKenzie | B60W 30/09 |
| 2022/0324459 A1 | 10/2022 | Narumi et al. | |

FOREIGN PATENT DOCUMENTS

| | | |
|---|---|---|
| JP | 2021-015496 | 2/2021 |
| WO | 2011/111206 | 9/2011 |
| WO | 2015/198542 | 12/2015 |

OTHER PUBLICATIONS

Japan Office Action issued in Japan Patent Application No. 2021-124177, dated Jan. 28, 2025, together with English translation thereof.

Japan Office Action issued in Japan Patent Application No. 2021-124177, dated Sep. 24, 2024, together with English translation thereof.

* cited by examiner

DROWSINESS DETERMINATION SYSTEM AND DROWSINESS DETERMINATION METHOD

CROSS REFERENCE TO RELATED APPLICATIONS

This is a continuation application of PCT International Application No. PCT/JP2022/000177 filed on Jan. 6, 2022, designating the United States of America, which is based on and claims priority of Japanese Patent Application No. 2021-047820 filed on Mar. 22, 2021, and Japanese Patent Application No. 2021-124177 filed on Jul. 29, 2021. The entire disclosures of the above-identified applications, including the specifications, drawings and claims are incorporated herein by reference in their entirety.

FIELD

The present disclosure relates to drowsiness determination systems and drowsiness determination methods for determining drowsiness of an occupant.

BACKGROUND

Patent Literature (PTL) 1 discloses a drowsiness determination device. The drowsiness determination device includes a determiner which determines whether an occupant is drowsy based on vehicle information indicating the amount of variation in the attitude of a vehicle relative to a road surface and head information indicating the amount of variation in the movement of the head of the occupant relative to a predetermined position. The determiner determines that the occupant is drowsy on conditions that when a variation in the attitude of the vehicle occurs, the direction of a variation in the movement of the head of the occupant is the same as the direction of the variation in the attitude of the vehicle and a delay time when the variation in the movement of the head of the occupant occurs relative to a time at which the variation in the attitude of the vehicle occurs is longer than a predetermined time.

CITATION LIST

Patent Literature

PTL 1: Japanese Patent No. 6516187

SUMMARY

However, the drowsiness determination device in PTL 1 can be improved upon.

In view of this, the present disclosure provides a drowsiness determination system and the like that can improve upon the related art.

A drowsiness determination system according to an aspect of the present disclosure includes a first acquirer, a second acquirer, a third acquirer, and a determiner. The first acquirer acquires vibration information indicating vibration of a vehicle. The second acquirer acquires head information indicating a variation in movement of a head of an occupant. The third acquirer acquires sitting height information indicating a sitting height of the occupant. The determiner determines whether the occupant is drowsy based on the head information and the sitting height information, when the vibration information indicates occurrence of the vibration of the vehicle.

A drowsiness determination method according to an aspect of the present disclosure includes: acquiring vibration information; acquiring head information; acquiring sitting height information; and determining. The acquiring of vibration information is acquiring vibration information indicating vibration of a vehicle. The acquiring of head information is acquiring head information indicating a variation in movement of a head of an occupant. The acquiring of sitting height information is acquiring sitting height information indicating a sitting height of the occupant. The determining is determining whether the occupant is drowsy based on the head information and the sitting height information, when the vibration information indicates occurrence of the vibration of the vehicle.

A drowsiness determination system and the like according to an aspect of the present disclosure can improve upon the related art.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
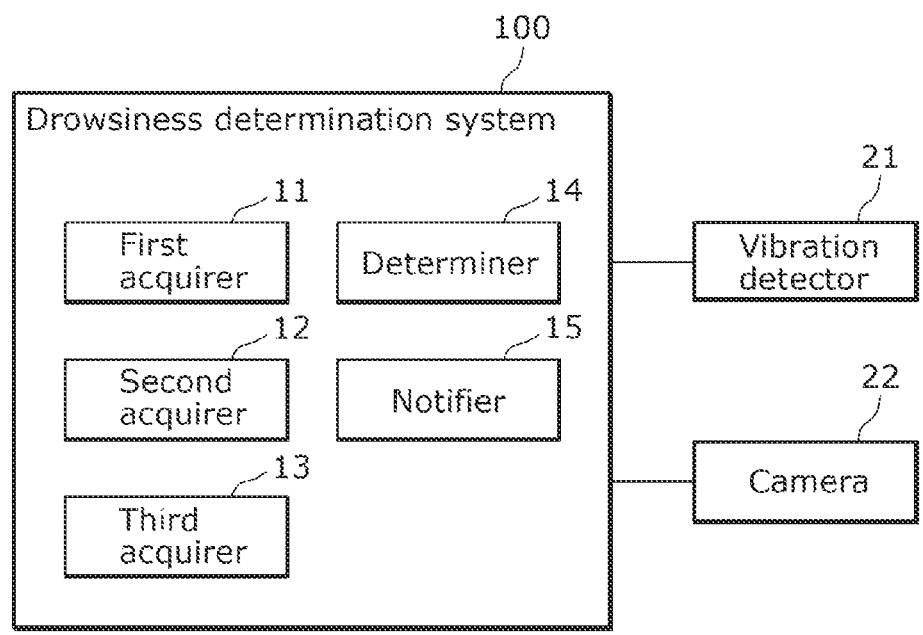
FIG. 1 is a block diagram schematically showing a drowsiness determination system in Embodiment 1.

A drowsiness determination system according to an aspect of the present disclosure includes a first acquirer, a second acquirer, a third acquirer, and a determiner. The first acquirer acquires vibration information indicating vibration of a vehicle. The second acquirer acquires head information indicating a variation in movement of a head of an occupant. The third acquirer acquires sitting height information indicating a sitting height of the occupant. The determiner determines whether the occupant is drowsy based on the head information and the sitting height information, when the vibration information indicates occurrence of the vibration of the vehicle.

In this way, with consideration given to the dependance of the head information on the sitting height of the occupant, not only the head information but also the sitting height information is referenced, and thus whether the occupant is drowsy is determined. Hence, as compared with a case where whether the occupant is drowsy is determined by referencing only the head information, it is possible to reduce the influence of individual differences in the reaction of the occupant to the vibration of the vehicle, with the result that the accuracy of determining the drowsiness of the occupant can be advantageously enhanced.

In a drowsiness determination system according to another aspect of the present disclosure, the third acquirer estimates the sitting height based on an image obtained by imaging the head to acquire the sitting height information.

In this way, the sitting height information can be utilized without being previously input by the occupant, and thus less effort is required for the occupant, with the result that convenience is enhanced easily and advantageously.

In a drowsiness determination system according to another aspect of the present disclosure, the determiner compares the head information and a threshold value to determine whether the occupant is drowsy. The determiner determines the threshold value from a plurality of threshold value candidates based on the sitting height information.

In this way, it is possible to determine the drowsiness of the occupant by a simple method of comparing the head information and an appropriate threshold corresponding to the sitting height information, with the result that the system can be designed easily and advantageously.

In a drowsiness determination system according to another aspect of the present disclosure, the determiner includes a determination model into which the vibration information and the head information are input and which outputs a result of the determination of whether the occupant is drowsy. The determiner determines the determination model from a plurality of determination model candidates based on the sitting height information.

In this way, as compared with a method for determining the drowsiness of the occupant by the comparison of the vibration information and the predetermined value and the comparison of the head information and the threshold value, it can be advantageously expected that the accuracy of determining the drowsiness of the occupant is further enhanced.

In a drowsiness determination system according to another aspect of the present disclosure, the head information includes at least one of a delay time until the variation in the movement of the head occurs in a predetermined period after a time at which the vibration of the vehicle occurs, the maximum value of an amplitude of the variation in the movement of the head relative to a predetermined position in the predetermined period, the average value of the amplitude of the variation in the movement of the head relative to the predetermined position in the predetermined period, or a dispersion of positions of the head relative to the predetermined position in the predetermined period.

In this way, it is possible to determine the drowsiness of the occupant by using one or more parameters which can vary according to the drowsiness of the occupant, with the result that the accuracy of determining the drowsiness of the occupant is enhanced easily and advantageously.

In a drowsiness determination system according to another aspect of the present disclosure, the determiner resets a measurement of the predetermined period when the predetermined period elapses or when magnitude of the vibration of the vehicle exceeds a predetermined value.

In this way, a variation in the movement of the head of the occupant which occurs regardless of the vibration of the vehicle is easily eliminated, with the result that the accuracy of determining the drowsiness of the occupant is further enhanced easily and advantageously.

In a drowsiness determination system according to another aspect of the present disclosure, the determiner does not determine whether the occupant is drowsy until the magnitude of the vibration of the vehicle exceeds the predetermined value after the measurement of the predetermined period is reset.

In this way, a variation in the movement of the head of the occupant which occurs regardless of the vibration of the vehicle is easily eliminated, with the result that the accuracy of determining the drowsiness of the occupant is further enhanced easily and advantageously.

In a drowsiness determination system according to another aspect of the present disclosure, the determiner decelerates the vehicle when the vibration of the vehicle does not occur for a predetermined time or more.

In this way, for example, even when the vibration of the vehicle does not occur for a long period of time due to a continuous flat road surface or the like, the vibration of the vehicle is forcibly generated, with the result that the drowsiness of the occupant can be advantageously determined. In particular, in the period during which the vibration of the vehicle does not occur, the drowsiness of the occupant is easily increased, and thus the drowsiness of the occupant is determined in the period, with the result that a measure for awakening the occupant or the like is taken easily and advantageously.

In a drowsiness determination system according to another aspect of the present disclosure, the determiner further determines whether the occupant is drowsy based on magnitude of the vibration information.

In this way, an error in the delay time based on the magnitude of the vibration information of the vehicle can be corrected, and thus a more highly accurate drowsiness determination can be performed advantageously.

In a drowsiness determination system according to another aspect of the present disclosure, when the determiner determines whether the occupant is drowsy based on the magnitude of the vibration information, a range in which the vibration information is determined to be small is wider than a range in which the vibration information is determined to be large.

In this way, the delay time for the movement of the head in the actual vibration of the vehicle does not significantly differ when the vibration of the vehicle is small, and as the vibration of the vehicle is increased, the delay time is sharply increased. Hence, with consideration given to the nonlinear behavior as described above, the magnitude of the vibration information can be determined, with the result that a more highly accurate drowsiness determination can be performed advantageously.

In a drowsiness determination system according to another aspect of the present disclosure, the determiner further determines a representative value of an eyelid position of the occupant in a predefined period from the head information based on an image obtained by imaging the head, and determines whether the occupant is drowsy with consideration given to the representative value of the eyelid position.

In this way, the representative value of the eyelid position is also used for the drowsiness determination, and thus a more highly accurate drowsiness determination can be performed advantageously.

In a drowsiness determination system according to another aspect of the present disclosure, the determiner determines head drowsiness and eyelid drowsiness, and determines whether the occupant is drowsy by assigning weights to the head drowsiness and the eyelid drowsiness, the head drowsiness being determined based on the head information and the sitting height information, the eyelid drowsiness being determined based on the representative value of the eyelid position.

In this way, for example, the weight to the eyelid drowsiness indicating the direct drowsiness is increased as compared with the head drowsiness, and thus it is possible to increase the influence of the eyelid drowsiness on the drowsiness as a whole, with the result that the accuracy of the drowsiness determination is further increased advantageously.

In a drowsiness determination system according to another aspect of the present disclosure, the determiner determines whether the occupant is wearing eyeglasses based on the head information, when the occupant is wearing the eyeglasses, the determiner determines a type of the eyeglasses, and the determiner determines whether the occupant is drowsy by assigning weights to the head drowsiness and the eyelid drowsiness according to a result of determining the type of the eyeglasses.

In this way, whether the occupant is wearing eyeglasses and an error in the eyelid drowsiness caused by the type of eyeglasses when the occupant is wearing eyeglasses can be covered by the head drowsiness, with the result that the accuracy of the drowsiness determination is increased advantageously.

In a drowsiness determination system according to another aspect of the present disclosure, when the occupant is not wearing sunglasses, the determiner assigns a greater weight to the eyelid drowsiness relative to the head drowsiness, and when the occupant is wearing the sunglasses, the determiner assigns a less weight to the eyelid drowsiness relative to the head drowsiness.

In this way, an error in the eyelid drowsiness caused by sunglasses can be covered by the head drowsiness, with the result that the accuracy of the drowsiness determination is increased advantageously.

A drowsiness determination method according to an aspect of the present disclosure includes: acquiring vibration information, acquiring head information; acquiring sitting height information; and determining. The acquiring of vibration information is acquiring vibration information indicating vibration of a vehicle. The acquiring of head information is acquiring head information indicating a variation in movement of a head of an occupant. The acquiring of sitting height information is acquiring sitting height information indicating a sitting height of the occupant. The determining is determining whether the occupant is drowsy based on the head information and the sitting height information, when the vibration information indicates occurrence of the vibration of the vehicle.

In this way, with consideration given to the dependance of the head information on the sitting height of the occupant, not only the head information but also the sitting height information is referenced, and thus whether the occupant is drowsy is determined. Hence, as compared with a case where whether the occupant is drowsy is determined by referencing only the head information, it is possible to reduce the influence of individual differences in the reaction of the occupant to the vibration of the vehicle, with the result that the accuracy of determining the drowsiness of the occupant can be advantageously enhanced.

In the drowsiness determination method according to the aspect of the present disclosure, in the determining, whether the occupant is drowsy is determined based further on magnitude of the vibration information.

In this way, an error in the delay time based on the magnitude of the vibration information of the vehicle can be corrected, and thus a more highly accurate drowsiness determination can be performed advantageously.

In the drowsiness determination method according to the aspect of the present disclosure, the determining further includes determining a representative value of an eyelid position of the occupant in a predefined period from the head information based on an image obtained by imaging the head, and determining whether the occupant is drowsy with consideration given to the representative value of the eyelid position.

In this way, the representative value of the eyelid position is also used for the drowsiness determination, and thus a more highly accurate drowsiness determination can be performed advantageously.

Embodiments 1 to 4 will be specifically described below with reference to drawings.

Each of the embodiments described below shows a comprehensive or specific example. Numerical values, shapes, materials, constituent elements, the arrangement and connection of the constituent elements, steps, the order of the steps, and the like shown in the following embodiments are examples, and are not intended to limit the present disclosure. Among the constituent elements in the following embodiments, constituent elements which are not recited in the independent claims are described as optional constituent elements.

The drawings are schematic views and are not exactly shown. In the drawings, the same configurations are identified with the same reference signs.

Embodiment 1

<Configuration>

FIG. 1 is a block diagram schematically showing drowsiness determination system 100 in Embodiment 1. Drowsiness determination system 100 in Embodiment 1 is used, for example, in a moving body such as vehicle 2 (see FIG. 2), and is a system for assisting the driving of vehicle 2. Although in Embodiment 1, drowsiness determination system 100 is realized by a vehicle-mounted device, drowsiness determination system 100 may be realized by an external device brought in from outside vehicle 2. Although in Embodiment 1, occupant 3 (see FIG. 2) who is targeted by drowsiness determination system 100 is the driver of the vehicle seated in the driver's seat, occupant 3 may be an occupant other than the driver who is seated in a front passenger seat or a rear seat.

As shown in FIG. 1, drowsiness determination system 100 includes first acquirer 11, second acquirer 12, third acquirer 13, determiner 14, and notifier 15. Drowsiness determination system 100 may include at least first acquirer 11, second acquirer 12, third acquirer 13, and determiner 14, and does not need to include notifier 15.

First acquirer 11 acquires vibration information which indicates vibration of vehicle 2. First acquirer 11 is a main unit which performs first acquisition step ST1 in a drowsiness determination method. First acquirer 11 acquires the result of detection output by vibration detector 21 to acquire the vibration information.

Vibration detector 21 is, for example, a gyro sensor mounted on vehicle 2, and detects the vibration of vehicle 2, that is, the amount of variation in the attitude of vehicle 2 relative to a road surface. The amount of variation in the attitude of vehicle 2 is indicated by the magnitude of the pitch angle, the roll angle, or the yaw angle of vehicle 2 relative to the road surface. The amount of variation in the attitude of vehicle 2 may be indicated, for example, by a distance between an end of vehicle 2 in a length direction and the road surface.

Vibration detector 21 is not limited to the gyro sensor, and may be, for example, an acceleration sensor which detects the acceleration of vehicle 2.

Second acquirer 12 acquires head information which indicates a variation in the movement of head 31 of occupant 3. Second acquirer 12 is a main unit which performs second acquisition step ST2 in the drowsiness determination method. Second acquirer 12 performs, for example, image processing as necessary on an image obtained by imaging, thereby calculates the amount of variation in the movement of head 31 of occupant 3 relative to a predetermined position, and acquires the head information based on the amount of variation in the movement of head 31 of occupant 3 which has been calculated. The image obtained by imaging is an image which includes head 31 of occupant 3, and is, for example, obtained by imaging using camera 22 mounted on vehicle 2. The predetermined position is, for example, the position of the headrest of seat 4 in which occupant 3 is seated, the position of a side door, or the like.

Specifically, second acquirer 12 performs the image processing as necessary on the image obtained by imaging, thereby extracts a characteristic point of head 31 of occupant 3, and calculates the coordinates of the characteristic point. The characteristic point is, for example, the top of head 31 of occupant 3. For example, the characteristic point may naturally be a part other than the top of the head such as the eyes of occupant 3. Second acquirer 12 calculates the amount of variation in the movement of the extracted characteristic point over time as the amount of variation in the movement of head 31 of occupant 3.

Figure 4:
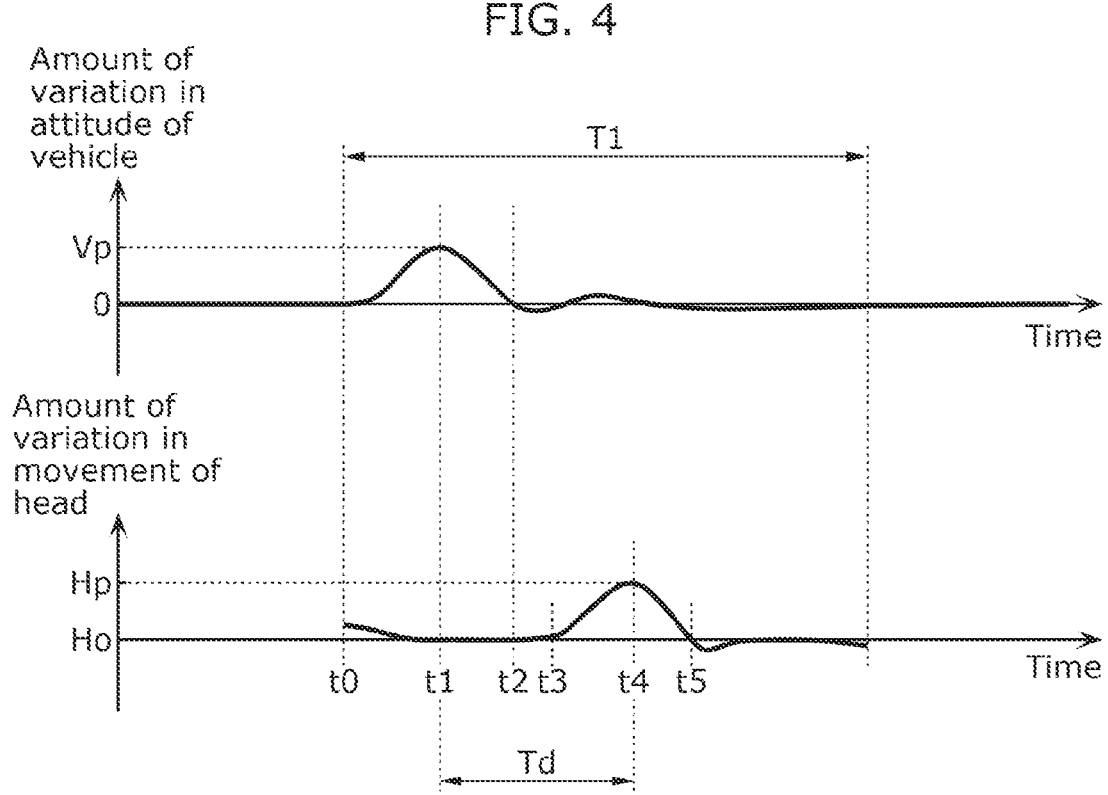
FIG. 4 is a waveform diagram showing an example of changes over time in the amount of variation in the attitude of the vehicle and the amount of variation in the movement of the head of the occupant.

In Embodiment 1, the head information is delay time Td (see FIG. 4). Delay time Td is a time corresponding to a difference between a time at which the amount of variation in the attitude of vehicle 2 (that is, the vibration of vehicle 2) reaches a peak and a time at which the amount of variation in the movement of head 31 of occupant 3 reaches a peak in predetermined period T1 (see FIG. 4) after a time at which the variation in the attitude of vehicle 2 (that is, the vibration of vehicle 2) occurs. Delay time Td is not limited to this time, and may be, for example, a time difference relative to the time at which the variation in the attitude of vehicle 2 occurs and a time at which the variation in the movement of head 31 of occupant 3 occurs.

Figure 2:
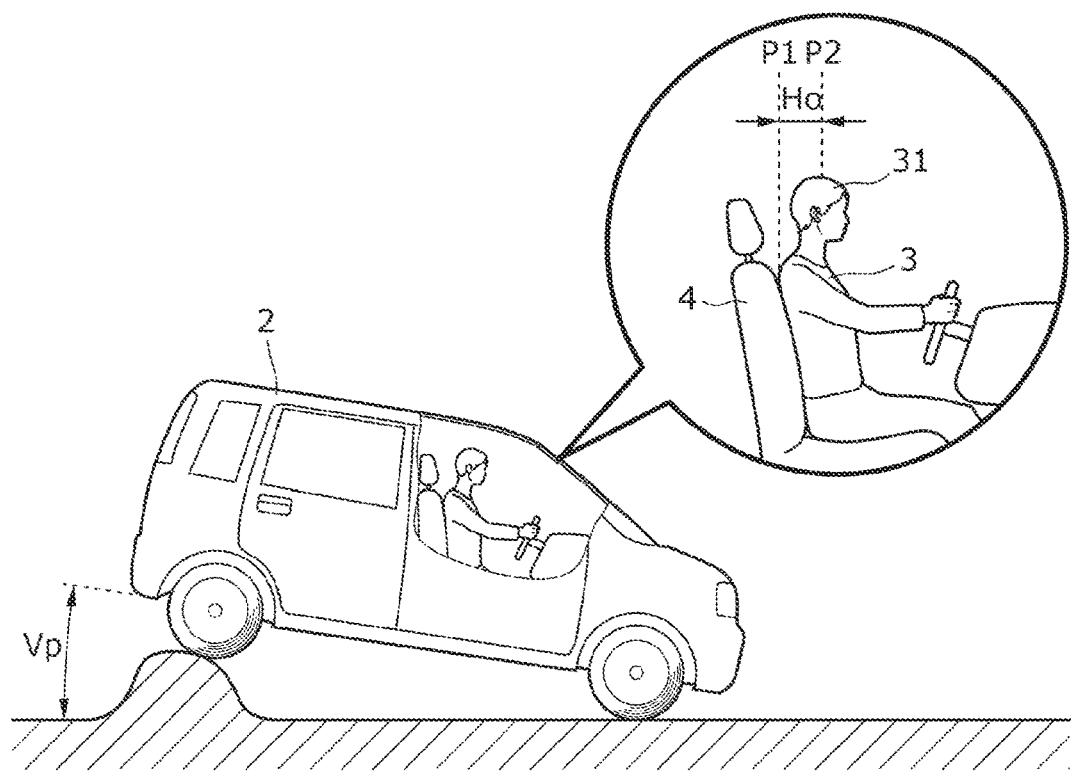
FIG. 2 is a diagram showing an example of a state of a vehicle and the head of an occupant when the amount of variation in the attitude of the vehicle reaches a peak.
Figure 3:
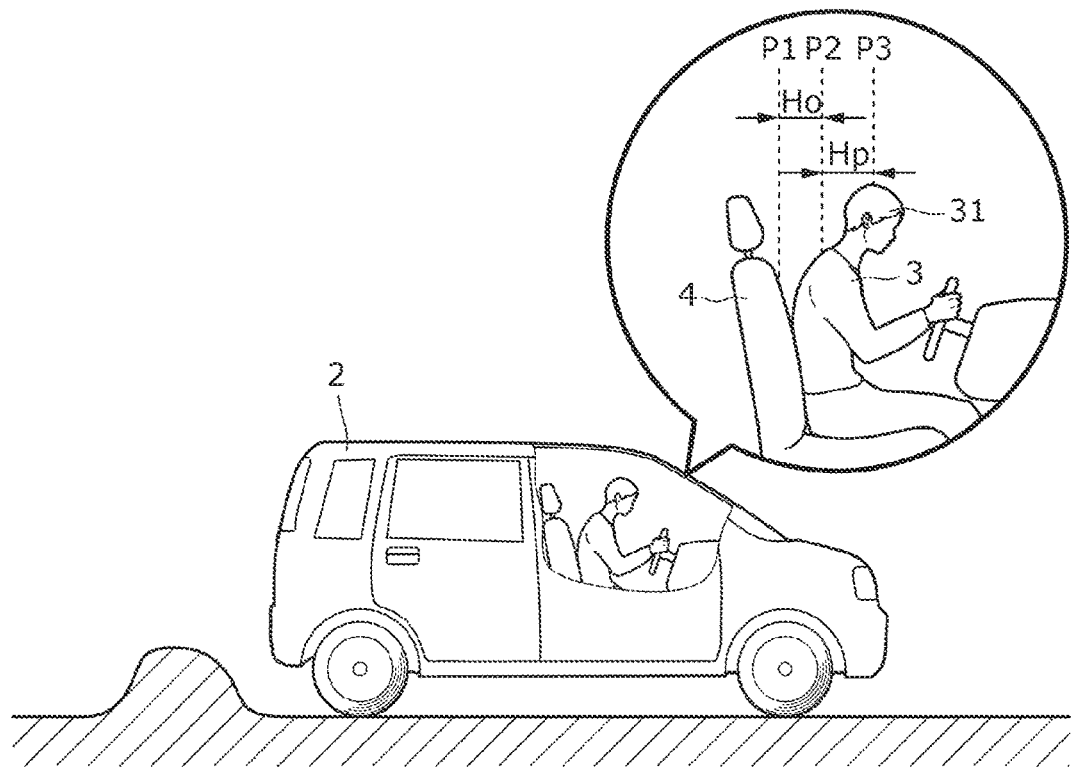
FIG. 3 is a diagram showing an example of the state of the vehicle and the head of the occupant when the amount of variation in the movement of the head of the occupant reaches a peak.

Delay time Td will be described in detail below with reference to FIGS. 2 to 4. FIG. 2 is a diagram showing an example of a state of vehicle 2 and head 31 of occupant 3 when the amount of variation in the attitude of vehicle 2 reaches a peak. FIG. 3 is a diagram showing an example of the state of vehicle 2 and head 31 of occupant 3 when the amount of variation in the movement of head 31 of occupant 3 reaches a peak. FIGS. 2 and 3 each emphasize the variations so that the variations in vehicle 2 and the movement of head 31 of occupant 3 can be visually grasped easily. FIG. 4 is a waveform diagram showing an example of changes over time in the amount of variation in the attitude of vehicle 2 and the amount of variation in the movement of head 31 of occupant 3.

It is assumed that as shown in FIG. 2, while vehicle 2 is travelling toward the right side of the figure, a variation in the attitude of vehicle 2 occurs in a pitch direction relative to the road surface due to acceleration or deceleration of vehicle 2, a change in the conditions of the road surface, or the like. In this case, as shown in FIG. 3, head 31 of occupant 3 is inclined to the side of the direction of travel of vehicle 2 (here, the right side of the figure) so as to follow the variation in the attitude of vehicle 2. Specifically, head 31 of occupant 3 (here, the top of the head serving as the characteristic point) varies in position from initial position P2 which is distance Ho away from predetermined position P1 (here, the position of the headrest) to peak position P3 in which the amount of variation reaches peak value Hp.

In an example shown in FIG. 4, the attitude of vehicle 2 starts the variation at time to, then the amount of variation reaches peak value Vp at time t1, and the attitude of vehicle 2 returns to its original state after time t3. On the other hand, head 31 of occupant 3 starts the variation at time t3 which is delayed from time t1 when the attitude of vehicle 2 starts the variation, then the amount of variation reaches peak value Hp at time t4, and head 31 of occupant 3 returns to its original state after time t5. Hence, in the example shown in FIG. 4, delay time Td is a time corresponding to a difference between time t1 at which the amount of variation in the attitude of vehicle 2 reaches peak value Vp and time t4 at which the amount of variation in the movement of head 31 of occupant 3 reaches peak value Hp in predetermined period T1 after time t1 at which the variation in the attitude of vehicle 2 (that is, the vibration of vehicle 2) occurs.

Here, when occupant 3 is not drowsy, occupant 3 makes a reflexive movement in response to the variation in the attitude of vehicle 2 in order to maintain the attitude of occupant 3. Specifically, when occupant 3 is not drowsy, occupant 3 immediately causes the behavior of head 31 to follow the variation in the attitude of vehicle 2, and thus the delay in the variation in the movement of head 31 of occupant 3 relative to the variation in the attitude of vehicle 2 is shortened. On the other hand, when occupant 3 is drowsy, as the consciousness of occupant 3 is lowered, the function of maintaining the attitude of occupant 3 is lowered. Hence, occupant 3 cannot immediately cause the behavior of head 31 to follow the variation in the attitude of vehicle 2, and thus the delay in the variation in the movement of head 31 of occupant 3 relative to the variation in the attitude of vehicle 2 is increased. As described above, delay time Td is a parameter which can vary according to the drowsiness of occupant 3, and as the degree of drowsiness of occupant 3 is increased, delay time Td can be increased.

The head information may be the maximum value (hereinafter also referred to as the "maximum value of the amplitude of the head") or the average value (hereinafter also referred to as the "average value of the amplitude of the head") of the amplitude of the variation in the movement of head 31 of occupant 3 relative to the predetermined position in predetermined period T1 described above. The head information may also be a dispersion (hereinafter also referred to as the "dispersion of the positions of the head")

of the positions of head 31 of occupant 3 relative to the predetermined position in predetermined period T1 described above. As with delay time Td, each of the maximum value of the amplitude of the head, the average value of the amplitude of the head, and the dispersion of the positions of the head described above is a parameter which can vary according to the drowsiness of occupant 3, and as the degree of drowsiness of occupant 3 is increased, the parameter can be increased.

In other words, the head information may include at least one of delay time Td until the variation in the movement of head 31 occurs in predetermined period T1 after the time at which the vibration of vehicle 2 occurs, the maximum value of the amplitude of the variation in the movement of head 31 relative to the predetermined position in predetermined period T1, the average value of the amplitude of the variation in the movement of head 31 relative to the predetermined position in predetermined period T1, or the dispersion of the positions of head 31 relative to the predetermined position in predetermined period T1.

Third acquirer 13 acquires sitting height information indicating the sitting height of occupant 3. Third acquirer 13 is a main unit which performs third acquisition step ST3 in the drowsiness determination method. For example, the "sitting height" here may be a sitting height defined by physical measurements or the like in a physical examination or may be a height from a part of occupant 3 who is seated in seat 4 to the top of head 31 of occupant 3. In the latter case, the sitting height can change depending on how occupant 3 is seated in seat 4, such as a case where occupant 3 sits shallowly in seat 4 or a case where occupant 3 sits deep in seat 4.

In Embodiment 1, third acquirer 13 estimates the sitting height based on the image obtained by imaging head 31 of occupant 3 to acquire the sitting height information. Specifically, third acquirer 13 performs image processing as necessary on the image obtained by imaging, thereby extracts the characteristic point of head 31 of occupant 3, and calculates the coordinates of the characteristic point. The characteristic point here is the top of head 31 of occupant 3. Third acquirer 13 calculates a difference in a height direction between coordinates indicating the position of the seating surface of seat 4 previously acquired and the coordinates of the characteristic point calculated, and thereby estimates the sitting height of occupant 3.

When camera 22 mounted on vehicle 2 is used to be able to image not only occupant 3 but also seat 4, third acquirer 13 may extract, from the image obtained by imaging, a part of seat 4 at which occupant 3 is seated, and calculate the coordinates of the extracted part as the coordinates indicating the position of the seating surface of seat 4. In this case, third acquirer 13 can estimate the sitting height only from the image obtained by imaging, and does not need to previously acquire the coordinates indicating the position of the seating surface of seat 4.

In Embodiment 1, third acquirer 13 estimates the sitting height of occupant 3 when occupant 3 is seated in seat 4. Each time imaging is performed by camera 22 mounted on vehicle 2, third acquirer 13 may use the image obtained by imaging to estimate the sitting height of occupant 3 in real time. In the latter case, even when the attitude of occupant 3 changes from moment to moment, it is easy to accurately estimate the sitting height of occupant 3.

Determiner 14 determines whether occupant 3 is drowsy based on the head information and the sitting height information, when the vibration information indicates the occurrence of the vibration of vehicle 2. Determiner 14 is a main unit which performs determination step ST4 in the drowsiness determination method. As described above, the head information (here, delay time Td) varies according to the drowsiness of occupant 3. Hence, in Embodiment 1, determiner 14 compares the head information and a threshold value to determine whether occupant 3 is drowsy.

Specifically, determiner 14 first references the vibration information acquired by first acquirer 11 to remain on standby until the amount of variation in the attitude of vehicle 2 (that is, the magnitude of the vibration of vehicle 2) exceeds a predetermined value. When the amount of variation exceeds the predetermined value, determiner 14 starts the measurement of predetermined period T1. Then, determiner 14 references the vibration information acquired by first acquirer 11 and the head information acquired by second acquirer 12 to determine whether the direction of the vibration of vehicle 2 is the same as the direction of the vibration of head 31 of occupant 3. When these directions are different from each other, determiner 14 does not perform processing for determining the drowsiness of occupant 3. On the other hand, when these directions are the same as each other, determiner 14 calculates delay time Td as the head information.

When determiner 14 compares delay time Td calculated and the threshold value, and delay time Td is less than or equal to the threshold value, determiner 14 determines that occupant 3 is not drowsy. On the other hand, when delay time Td exceeds the threshold value, determiner 14 determines that occupant 3 is drowsy. When determiner 14 determines that occupant 3 is drowsy, determiner 14 outputs a notification command to notifier 15.

Here, as already described, when occupant 3 is drowsy, a response to the variation in the attitude of vehicle 2 is delayed, and thus delay time Td is increased. However, there are individual differences in this response delay. In other words, the head information (here, delay time Td) may also individually differ depending on occupant 3, with the result that it is disadvantageously difficult to uniquely determine the threshold value.

The inventors of the present application have found that the individual differences depend on the sitting height of occupant 3. Specifically, the amplitude of the vibration of head 31 of occupant 3 is changed by a distance between head 31 (the top of the head) of occupant 3 and the part of seat 4 at which occupant 3 is seated and which serves as the starting point of the vibration of head 31 of occupant 3. In other words, as the sitting height of occupant 3 is higher, delay time Td can be increased.

Figure 5:
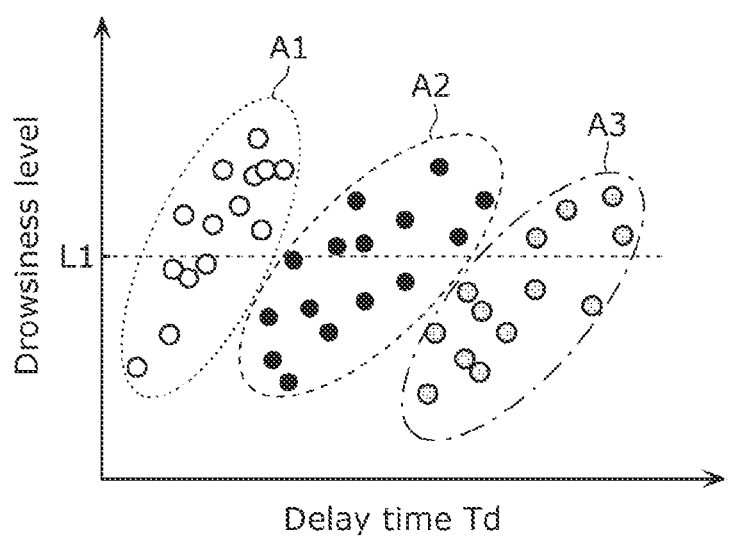
FIG. 5 is a scatter diagram showing a correlation between the drowsiness level of the occupant, a delay time, and the sitting height of the occupant.

FIG. 5 is a scatter diagram showing a correlation between the drowsiness level of occupant 3, delay time Td, and the sitting height of occupant 3. In FIG. 5, a vertical axis represents the drowsiness level of occupant 3, and a horizontal axis represents delay time Td. The drowsiness level is, for example, defined by Kwansei Gakuin Sleepiness Scale (KSS), Karolinska Sleepiness Scale (KSS), facial expression evaluation, or the like. Dots in FIG. 5 represent data for a large number of occupants 3 having different sitting heights. In FIG. 5, a first data group surrounded by dotted line A1 represents the data group of occupants 3 whose sitting heights are lower than a first predetermined value, and a third data group surrounded by dashed-dotted line A3 represents the data group of occupants 3 whose sitting heights are higher than a second predetermined value (>first predetermined value). In FIG. 5, a second data group surrounded by dashed line A2 represents the data group of occupants 3 whose sitting heights are in a range between the first predetermined value and the second predetermined value.

As shown in FIG. 5, even when the drowsiness level is the same, corresponding delay time Td differs depending on the sitting height of occupant 3. For example, when the drowsiness level is "L1", delay time Td of occupant 3 belonging to the first data group, delay time Td of occupant 3 belonging to the second data group, and delay time Td of occupant 3 belonging to the third data group are different from each other.

Hence, in Embodiment 1, determiner 14 determines, based on the sitting height information acquired by third acquirer 13, a threshold value used for the determination of drowsiness of occupant 3 from a plurality of threshold value candidates. Specifically, when the sitting height of occupant 3 is lower than the first predetermined value, determiner 14 determines, from three threshold value candidates, a first threshold value as the threshold value used for the determination of drowsiness of occupant 3. When the sitting height of occupant 3 is between the first predetermined value and the second predetermined value, determiner 14 determines, from the three threshold value candidates, a second threshold value (>first threshold value) as the threshold value used for the determination of drowsiness of occupant 3. When the sitting height of occupant 3 is higher than the second predetermined value, determiner 14 determines, from the three threshold value candidates, a third threshold value (>second threshold value) as the threshold value used for the determination of drowsiness of occupant 3.

When predetermined period T1 elapses or the amount of variation in the attitude of vehicle 2 (that is, the magnitude of the vibration of vehicle 2) exceeds the predetermined value, determiner 14 resets the measurement of predetermined period T1. Specifically, when predetermined period T1 has elapsed since the start of the measurement of predetermined period T1, determiner 14 stops the processing for determining the drowsiness of occupant 3. When in predetermined period T1 after the start of the measurement of predetermined period T1, the magnitude of the vibration of vehicle 2 exceeds the predetermined value, that is, another variation in the attitude of vehicle 2 occurs, determiner 14 resets the measurement of predetermined period T1 so that the time at which this variation occurs is used as the starting point of predetermined period T1.

Until the amount of variation in the attitude of vehicle 2 (that is, the magnitude of the vibration of vehicle 2) exceeds the predetermined value after the measurement of predetermined period T1 is reset, determiner 14 does not determine whether occupant 3 is drowsy. In other words, determiner 14 does not start another measurement of predetermined period T1 immediately after predetermined period T1 has elapsed, and until another variation in the attitude of vehicle 2 occurs, determiner 14 does not perform the processing for determining the drowsiness of occupant 3.

Determiner 14 decelerates vehicle 2 when the vibration of vehicle 2 does not occur for a predetermined time or more. The "vibration of vehicle 2 does not occur" described here includes not only a case where vehicle 2 does not vibrate at all but also a case where the magnitude of the vibration of vehicle 2 falls below the predetermined value. Specifically, determiner 14 monitors the vibration information to measure a time for which the vibration of vehicle 2 does not occur. When the vibration of vehicle 2 does not occur for the predetermined time or more, determiner 14 transmits a command for decelerating vehicle 2 to an electronic control unit (ECU) mounted on vehicle 2. The ECU which has received the command decelerates vehicle 2, for example, by shifting down control. In this way, the attitude of vehicle 2 is forcibly varied, and thus determiner 14 can perform the processing for determining the drowsiness of occupant 3. The deceleration of vehicle 2 is the extent to which a variation in the movement of head 31 of occupant 3 is induced, and thus the deceleration does not interfere with the driving of vehicle 2.

After the processing for determining the drowsiness of occupant 3 is performed, determiner 14 may transmit, to the ECU, a command for returning the speed of vehicle 2 to its original speed. The ECU which has received the command returns the speed of vehicle 2 to its original speed, for example, by shifting up control.

When notifier 15 receives the notification command from determiner 14, notifier 15 provides notification for awakening occupant 3, for example, by outputting a warning sound from a speaker.

<Operation>

Figure 6:
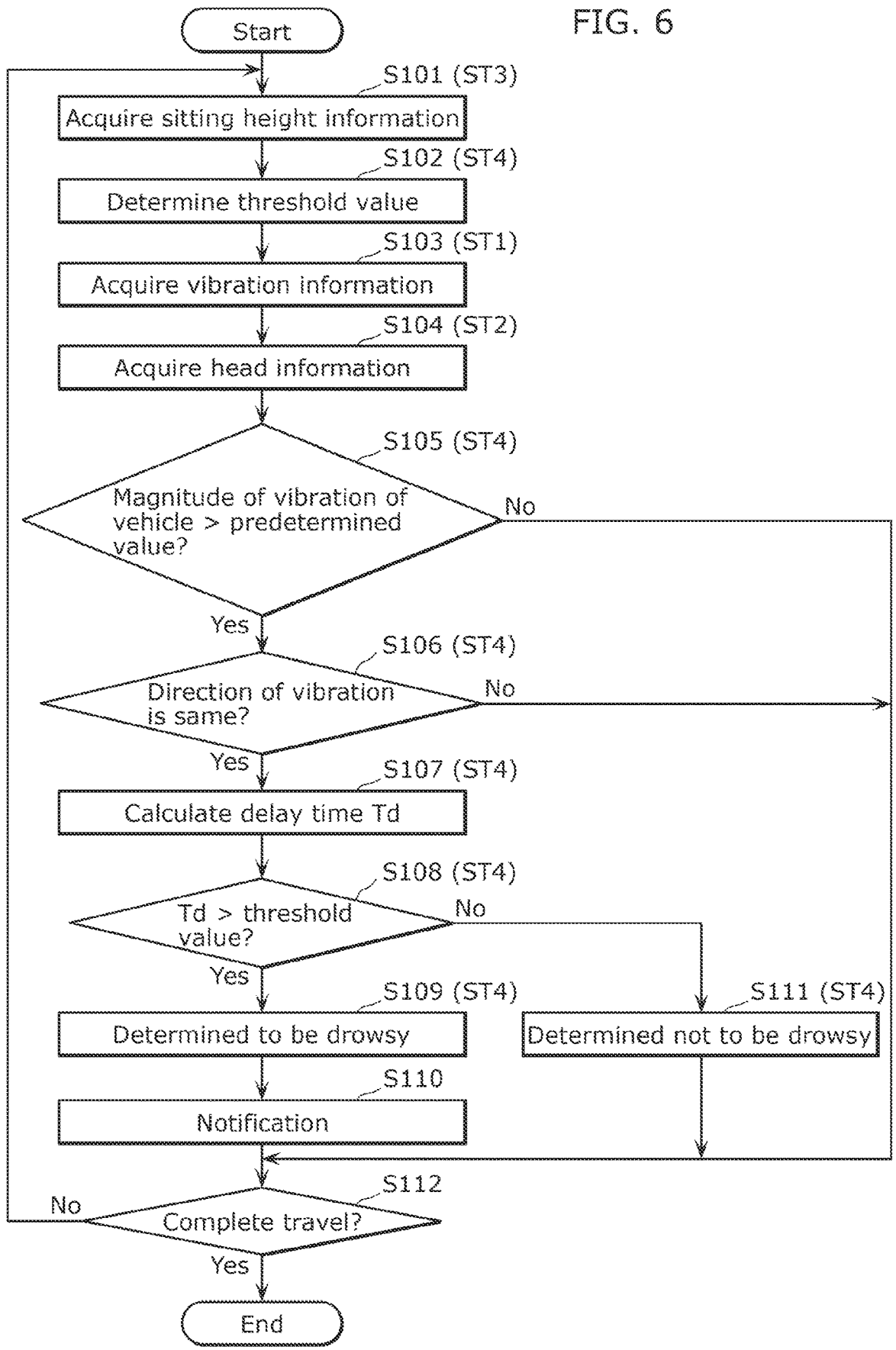
FIG. 6 is a flowchart showing an example of an operation of the drowsiness determination system in Embodiment 1.

The operation of drowsiness determination system 100 in Embodiment 1 will be described below with reference to FIG. 6. FIG. 6 is a flowchart showing an example of the operation of drowsiness determination system 100 in Embodiment 1. A case where the head information is delay time Td will be described below.

First, when the travel of vehicle 2 is started, third acquirer 13 acquires the sitting height information (S101). Processing S101 corresponds to third acquisition step ST3 in the drowsiness determination method. Then, determiner 14 references the sitting height information acquired by third acquirer 13 to determine a threshold value corresponding to the sitting height of occupant 3 from a plurality of threshold value candidates (S102). Processing S102 corresponds to determination step ST4 in the drowsiness determination method. Then, first acquirer 11 acquires the vibration information (S103). Processing S103 corresponds to first acquisition step ST1 in the drowsiness determination method. Second acquirer 12 acquires the head information (S104). Processing S104 corresponds to second acquisition step ST2 in the drowsiness determination method. Processing S103 and S104 is constantly performed during the travel of vehicle 2.

Based on the vibration information acquired by first acquirer 11, determiner 14 monitors whether the magnitude of the vibration of vehicle 2 exceeds the predetermined value (S105). When the magnitude of the vibration of vehicle 2 exceeds the predetermined value (S105: yes), determiner 14 further determines, based on the head information acquired by second acquirer 12, whether the direction of the vibration of vehicle 2 is the same as the direction of the vibration of head 31 of occupant 3 (S106). On the other hand, when the magnitude of the vibration of vehicle 2 does not exceed the predetermined value (S105: no), determiner 14 performs nothing in particular.

When the direction of the vibration of vehicle 2 is the same as the direction of the vibration of head 31 of occupant 3 (S106: yes), determiner 14 calculates delay time Td (S107). Then, determiner 14 compares delay time Td calculated and the threshold value determined in processing S102 (S108). When delay time Td is greater than the threshold value (S108: yes), determiner 14 determines that occupant 3 is drowsy (S109). Then, determiner 14 outputs the notification command to notifier 15, and thereby causes notifier 15 to provide notification for awakening occupant 3 (S110). On the other hand, when delay time Td is less than or equal to the threshold value (S108: no), determiner 14 determines that occupant 3 is not drowsy (S111). When the direction of the vibration of vehicle 2 is not the same as the direction of the vibration of head 31 of occupant 3 (S106: no), determiner 14 performs nothing in particular. Processing S105 to S109 and S111 corresponds to determination step ST4 in the drowsiness determination method. Drowsiness determination system 100 repeats a series of processing steps described above until the travel of vehicle 2 is completed (S112: no). Then, when the travel of vehicle 2 is completed (S112: yes), drowsiness determination system 100 completes the operation.

<Functional Effects>

As described above, drowsiness determination system 100 in Embodiment 1 includes first acquirer 11, second acquirer 12, third acquirer 13, and determiner 14. First acquirer 11 acquires the vibration information indicating the vibration of vehicle 2. Second acquirer 12 acquires the head information indicating the variation in the movement of head 31 of occupant 3. Third acquirer 13 acquires the sitting height information indicating the sitting height of occupant 3. Determiner 14 determines whether occupant 3 is drowsy based on the head information and the sitting height information, when the vibration information indicates the occurrence of the vibration of vehicle 2.

In this way, with consideration given to the dependance of the head information on the sitting height of occupant 3, not only the head information but also the sitting height information is referenced, and thus whether occupant 3 is drowsy is determined. Hence, as compared with a case where whether occupant 3 is drowsy is determined by referencing only the head information, it is possible to reduce the influence of individual differences in the reaction of occupant 3 to the vibration of vehicle 2, with the result that the accuracy of determining the drowsiness of occupant 3 can be advantageously enhanced.

In drowsiness determination system 100 in Embodiment 1, third acquirer 13 estimates the sitting height based on the image obtained by imaging head 31 to acquire the sitting height information.

In this way, the sitting height information can be utilized without being previously input by occupant 3, and thus less effort is required for occupant 3, with the result that convenience is enhanced easily and advantageously.

In drowsiness determination system 100 in Embodiment 1, determiner 14 compares the head information and the threshold value to determine whether occupant 3 is drowsy. Determiner 14 determines the threshold value from a plurality of threshold value candidates based on the sitting height information.

In this way, it is possible to determine the drowsiness of occupant 3 by a simple method of comparing the head information and an appropriate threshold corresponding to the sitting height information, with the result that the system can be designed easily and advantageously.

In drowsiness determination system 100 in Embodiment 1, the head information includes at least one of delay time Td until the variation in the movement of head 31 occurs in predetermined period T1 after a time at which the vibration of vehicle 2 occurs, the maximum value of the amplitude of the variation in the movement of head 31 relative to the predetermined position in predetermined period T1, the average value of the amplitude of the variation in the movement of head 31 relative to the predetermined position in predetermined period T1, or the dispersion of the positions of head 31 relative to the predetermined position in predetermined period T1.

In this way, it is possible to determine the drowsiness of occupant 3 by using one or more parameters which can vary according to the drowsiness of occupant 3, with the result that the accuracy of determining the drowsiness of occupant 3 is enhanced easily and advantageously.

In drowsiness determination system 100 in Embodiment 1, determiner 14 resets the measurement of predetermined period T1 when predetermined period T1 elapses or when the magnitude of the vibration of vehicle 2 exceeds the predetermined value.

In this way, a variation in the movement of head 31 of occupant 3 which occurs regardless of the vibration of vehicle 2 is easily eliminated, with the result that the accuracy of determining the drowsiness of occupant 3 is further enhanced easily and advantageously.

In drowsiness determination system 100 in Embodiment 1, determiner 14 does not determine whether occupant 3 is drowsy until the magnitude of the vibration of vehicle 2 exceeds the predetermined value after the measurement of predetermined period T1 is reset.

In this way, a variation in the movement of head 31 of occupant 3 which occurs regardless of the vibration of vehicle 2 is easily eliminated, with the result that the accuracy of determining the drowsiness of occupant 3 is further enhanced easily and advantageously.

In drowsiness determination system 100 in Embodiment 1, determiner 14 decelerates vehicle 2 when the vibration of vehicle 2 does not occur for a predetermined time or more.

In this way, for example, even when the vibration of vehicle 2 does not occur for a long period of time due to a continuous flat road surface or the like, the vibration of vehicle 2 is forcibly generated, with the result that the drowsiness of occupant 3 can be advantageously determined. In particular, in the period during which the vibration of vehicle 2 does not occur, the drowsiness of occupant 3 is easily increased, and thus the drowsiness of occupant 3 is determined in the period, with the result that a measure for awakening occupant 3 or the like is taken easily and advantageously.

The drowsiness determination method in Embodiment 1 includes first acquisition step ST1, second acquisition step ST2, third acquisition step ST3, and determination step ST4. In first acquisition step ST1, the vibration information indicating the vibration of vehicle 2 is acquired. In second acquisition step ST2, the head information indicating the variation in the movement of head 31 of occupant 3 is acquired. In third acquisition step ST3, the sitting height information indicating the sitting height of occupant 3 is acquired. In determination step ST4, whether occupant 3 is drowsy is determined based on the head information and the sitting height information, when the vibration information indicates the occurrence of the vibration of vehicle 2.

In this way, with consideration given to the dependance of the head information on the sitting height of occupant 3, not only the head information but also the sitting height information is referenced, and thus whether occupant 3 is drowsy is determined. Hence, as compared with a case where whether occupant 3 is drowsy is determined by referencing only the head information, it is possible to reduce the influence of individual differences in the reaction of occupant 3 to the vibration of vehicle 2, with the result that the accuracy of determining the drowsiness of occupant 3 can be advantageously enhanced.

Embodiment 2

<Configuration>

Figure 7:
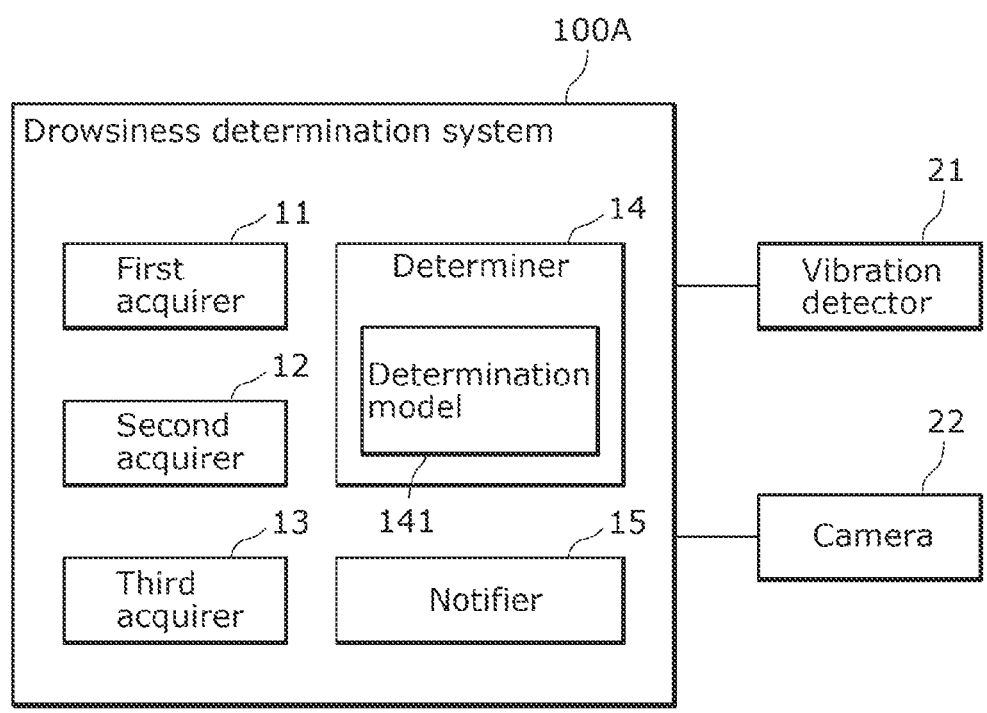
FIG. 7 is a block diagram schematically showing a drowsiness determination system in Embodiment 2.

FIG. 7 is a block diagram schematically showing drowsiness determination system 100A in Embodiment 2. Drowsiness determination system 100A in Embodiment 2 differs from drowsiness determination system 100 in Embodiment 1 in that determiner 14 uses determination model 141 to determine the drowsiness of occupant 3. Only differences from drowsiness determination system 100 in Embodiment 1 will be mainly described below, and the description of points common to drowsiness determination system 100 in Embodiment 1 is omitted.

Determiner 14 includes determination model 141 into which the vibration information of vehicle 2 and the head information are input and which outputs the result of the determination of whether occupant 3 is drowsy. In Embodiment 2, determination model 141 is a learned model which has undergone machine learning so as to output the result of the determination when the vibration information of vehicle 2 and the head information are input. Determination model 141 is formed with, for example, a neural network having a multilayer structure, and is a model which has completed machine learning such that when the vibration information of vehicle 2 and the head information are input, the result of the determination of whether occupant 3 is drowsy is output according to the vibration information of vehicle 2 and the head information. Here, the head information which is input to determiner 14 includes at least one of delay time Td, the maximum value of the amplitude of the head, the average value of the amplitude of the head, or the dispersion of the positions of the head which have already been described, and may include two or more thereof.

For example, determination model 141 is machine-learned by supervised learning using a large number of learning data sets. Each of the learning data sets includes: the vibration information of vehicle 2 and the head information which serve as input data (explanatory variables); and drowsiness levels (here, two levels of whether occupant 3 is drowsy) which serve as correct data (objective variables). Determination model 141 may be, for example, a model obtained by multiple regression analysis in which the drowsiness levels are used as the objective variables and the vibration information of vehicle 2 and the head information are used as the explanatory variables.

As in Embodiment 1, determiner 14 determines determination model 141 from a plurality of candidates for determination model 141 based on the sitting height information acquired by third acquirer 13. Specifically, determiner 14 stores, as the candidates for determination model 141, three determination models which differ from each other according to the sitting height of occupant 3, that is, a first determination model, a second determination model, and a third determination model. The first determination model is a model in which machine learning has been completed on occupant 3 whose sitting height is lower than the first predetermined value. The second determination model is a model in which machine learning has been completed on occupant 3 whose sitting height is between the first predetermined value and the second predetermined value. The third determination model is a model in which machine learning has been completed on occupant 3 whose sitting height is higher than the second predetermined value.

Then, when the sitting height of occupant 3 is lower than the first predetermined value, determiner 14 determines the first determination model from the three candidates for determination model 141 as determination model 141 used for the determination of drowsiness of occupant 3. When the sitting height of occupant 3 is between the first predetermined value and the second predetermined value, determiner 14 determines the second determination model from the three candidates for determination model 141 as determination model 141 used for the determination of drowsiness of occupant 3. When the sitting height of occupant 3 is higher than the second predetermined value, determiner 14 determines the third determination model from the three candidates for determination model 141 as the threshold value used for the determination of drowsiness of occupant 3.

<Operation>

Figure 8:
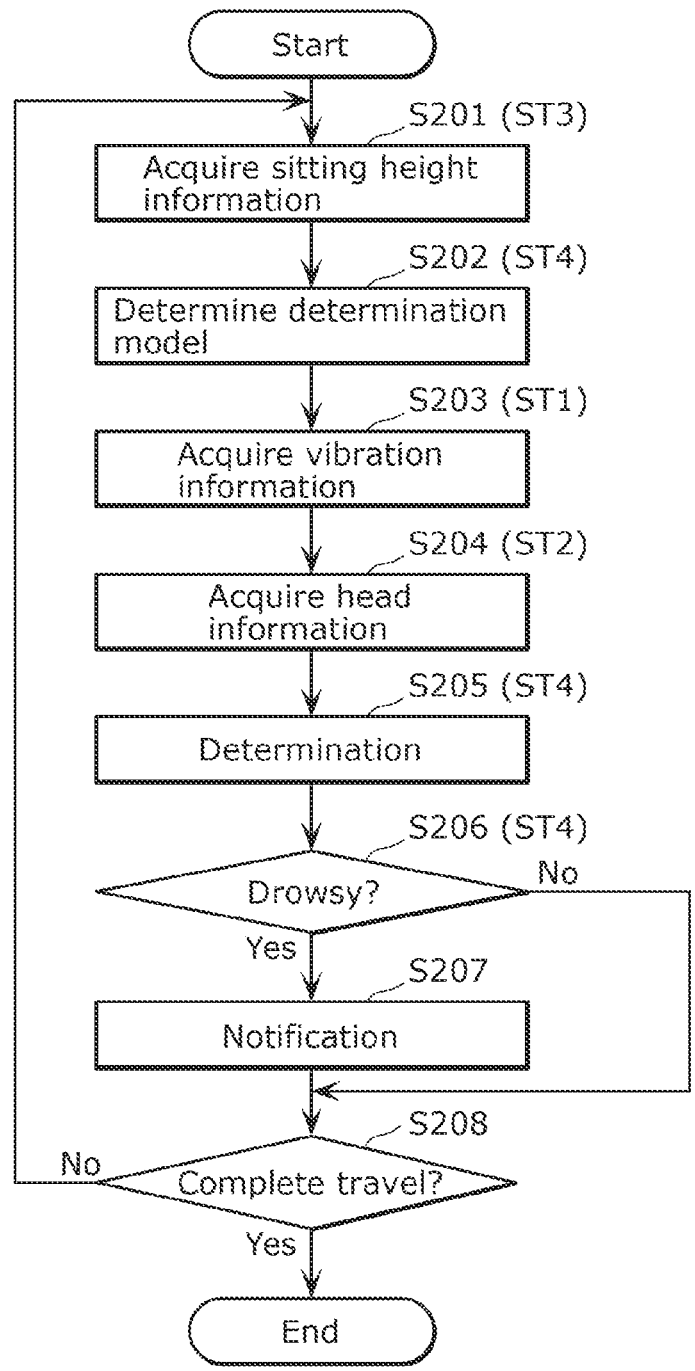
FIG. 8 is a flowchart showing an example of an operation of the drowsiness determination system in Embodiment 2.

The operation of drowsiness determination system 100A in Embodiment 2 will be described below with reference to FIG. 8. FIG. 8 is a flowchart showing an example of the operation of drowsiness determination system 100A in Embodiment 2.

First, when the travel of vehicle 2 is started, third acquirer 13 acquires the sitting height information (S201). Processing S201 corresponds to third acquisition step ST3 in the drowsiness determination method. Then, determiner 14 references the sitting height information acquired by third acquirer 13 to determine determination model 141 corresponding to the sitting height of occupant 3 from a plurality of candidates for determination model 141 (S202). Processing S202 corresponds to determination step ST4 in the drowsiness determination method. Then, first acquirer 11 acquires the vibration information (S203). Processing S203 corresponds to first acquisition step ST1 in the drowsiness determination method. Second acquirer 12 acquires the head information (S204). Processing S204 corresponds to second acquisition step ST2 in the drowsiness determination method. Processing S203 and S204 is constantly performed during the travel of vehicle 2.

Determiner 14 uses determination model 141 determined in processing S202 to determine whether occupant 3 is drowsy (S205). Here, determiner 14 uses the vibration information and the head information to determine whether occupant 3 is drowsy while including a determination of whether the direction of the vibration of vehicle 2 is the same as the direction of the vibration of head 31 of occupant 3 based on the vibration information and the head information. When determiner 14 determines that occupant 3 is drowsy (S206: yes), determiner 14 outputs the notification command to notifier 15, and thereby causes notifier 15 to provide notification for awakening occupant 3 (S207). On the other hand, when determiner 14 determines that occupant 3 is not drowsy (S206: no), determiner 14 performs nothing in particular. Processing S205 to S207 corresponds to determination step ST4 in the drowsiness determination method. Drowsiness determination system 100A repeats a series of processing steps described above until the travel of vehicle 2 is completed (S208: no). When the travel of vehicle 2 is completed (S208: yes), drowsiness determination system 100A completes the operation.

<Functional Effects>

As described above, in drowsiness determination system 100A in Embodiment 2, determiner 14 includes determination model 141 into which the vibration information and the head information are input and which outputs the result of the determination of whether occupant 3 is drowsy. Determiner 14 determines determination model 141 from a plurality of candidates for determination model 141 based on the sitting height information.

In this way, as compared with the method for determining the drowsiness of occupant 3 by the comparison of the vibration information and the predetermined value and the comparison of the head information and the threshold value, it can be advantageously expected that the accuracy of determining the drowsiness of occupant 3 is further enhanced.

(Other Variations)

Although the drowsiness determination system according to the present disclosure has been described above based on Embodiments 1 and 2, the present disclosure is not limited to Embodiments 1 and 2. Embodiments obtained by performing, on Embodiments 1 and 2, various variations conceivable by a person skilled in the art may be included in the scope of the present disclosure without departing from the spirit of the present disclosure.

Although in Embodiment 1 described above, determiner 14 compares delay time Td serving as the head information and the threshold value to determine whether occupant 3 is drowsy, the present disclosure is not limited to this configuration. For example, determiner 14 may compare one of the maximum value of the amplitude of the head, the average value of the amplitude of the head, and the dispersion of the positions of the head with the threshold value to determine whether occupant 3 is drowsy.

In Embodiment 1 described above, determiner 14 may compare each of a plurality of parameters (such as delay time Td) serving as the head information with the corresponding threshold value to determine whether occupant 3 is drowsy. In this case, determiner 14 may calculate the drowsiness level for each of the parameters, and reference the majority drowsiness level or the highest drowsiness level among a plurality of drowsiness levels to determine whether occupant 3 is drowsy.

Although in Embodiment 2 described above, determiner 14 determines one determination model 141 from a plurality of determination model candidates which differ from each other according to the sitting height of occupant 3, the present disclosure is not limited to this configuration. For example, determination model 141 may be a learned model in which machine learning that also uses the sitting height of occupant 3 as input data (explanatory variables) has been completed. In this case, determiner 14 may include one determination model 141, and it is necessary to determine determination model 141 from a plurality of candidates for determination model 141 based on the sitting height information.

Although in each of the embodiments described above, third acquirer 13 estimates the sitting height of occupant 3 based on the image obtained by imaging head 31 of occupant 3 to acquire the head information, the present disclosure is not limited to this configuration. For example, third acquirer 13 may be an input interface which receives an input operated by occupant 3 and acquires the sitting height input by occupant 3 as the sitting height information. In this case, third acquirer 13 does not need to have the function of estimating the sitting height of occupant 3.

Although in each of the embodiments described above, determiner 14 determines the drowsiness of occupant 3 by two drowsiness levels of whether occupant 3 is drowsy, the present disclosure is not limited to this configuration. For example, determiner 14 may determine the drowsiness of occupant 3 by three or more drowsiness levels.

In an example, based on the head information (for example, delay time Td), determiner 14 may determine the drowsiness of occupant 3 by five drowsiness levels of "level 1" to "level 5". The "level 1" is a level at which it is estimated that occupant 3 is not drowsy at all. The "level 2" is a level at which it is estimated that occupant 3 is slightly drowsy. The "level 3" is a level at which it is estimated that occupant 3 is drowsy. The "level 4" is a level at which it is estimated that occupant 3 is very drowsy. The "level 5" is a level at which it is estimated that occupant 3 is extremely drowsy. Determiner 14 determines that as delay time Td is longer, the drowsiness level is higher.

When as described above, determiner 14 determines the drowsiness of occupant 3 by three or more drowsiness levels, notifier may provide notification corresponding to the drowsiness level. For example, as the drowsiness level is higher, notifier 15 may output a warning sound with a louder volume. Notifier 15 may change notification according to the drowsiness level; for example, when the drowsiness level is low, notifier 15 outputs a warning sound such as a "beep", and when the drowsiness level is high, notifier 15 outputs an alarm sound such as a "long beep". Furthermore, notifier 15 may combine, according to the drowsiness level, a means, such as the vibration of a sheet belt or air blowing from an air conditioner, which acts on a sense other than the hearing of occupant 3. As described above, notifier 15 provides notification corresponding to the drowsiness level, and thus it is possible to provide an appropriate warning to occupant 3.

Although in each of the embodiments described above, determiner 14 calculates delay time Td relative to the time at which the vibration of vehicle 2 reaches a peak and the time at which the vibration of head 31 of occupant 3 reaches a peak, the present disclosure is not limited to this configuration. For example, determiner 14 may calculate delay time Td based on a correlation between the vibration of vehicle 2 and the vibration of head 31 of occupant 3. Specifically, when the pattern of the vibration of vehicle 2 is similar to the pattern of the vibration of head 31 of occupant 3, determiner 14 may determine a difference between a time (for example, a start time) at which the pattern of the vibration of vehicle 2 is generated and a time at which the pattern of the vibration of head 31 of occupant 3 is generated, and thereby calculate delay time Td.

Embodiment 3

A drowsiness determination system in Embodiment 3 differs from drowsiness determination system 100 in Embodiment 1 in that whether occupant 3 is drowsy is further determined based on peak value Vp (the magnitude of the vibration information of vehicle 2) in the amount of variation in the attitude of vehicle 2. The configuration of the drowsiness determination system in Embodiment 3 is the same as the configuration of drowsiness determination system 100 in Embodiment 1 shown in FIG. 1. Only differences from drowsiness determination system 100 in Embodiment 1 will be mainly described below, and the description of points common to drowsiness determination system 100 in Embodiment 1 is omitted.

<Operation>

Figure 9:
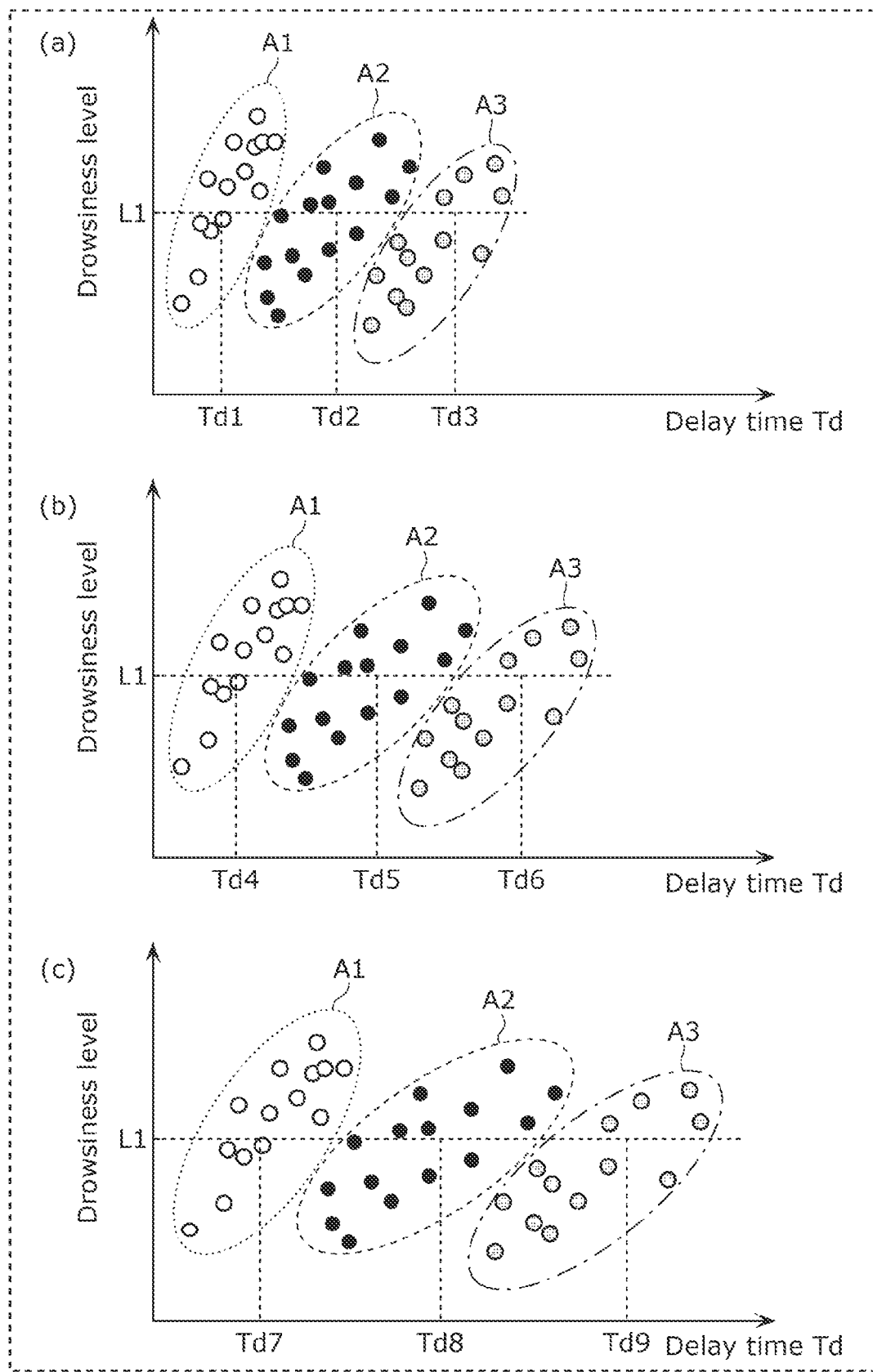
FIG. 9 illustrates scatter diagrams showing correlations between the drowsiness level of the occupant based on a peak value in the amount of variation in the attitude of the vehicle, the delay time, and the sitting height of the occupant in a drowsiness determination system in Embodiment 3: part (a) is the scatter diagram when the peak value is low, part (b) is the scatter diagram when the peak value is medium, and part (c) is the scatter diagram when the peak value is high.

FIG. 9 illustrates scatter diagrams showing correlations between the drowsiness level of the occupant based on peak value Vp in the amount of variation in the attitude of vehicle 2, delay time Td, and the sitting height of the occupant in the drowsiness determination system in Embodiment 3, part (a) is the scatter diagram when peak value Vp is low, part (b) is the scatter diagram when peak value Vp is medium, and part (c) is the scatter diagram when peak value Vp is high. In parts (a) to (c) in FIG. 9, a vertical axis represents the drowsiness level of occupant 3, and a horizontal axis represents delay time Td. In each of the figures, the meanings of a first data group surrounded by dotted line A1, a second data group surrounded by dashed line A2, and a third data group surrounded by dashed-dotted line A3 are the same as in FIG. 5 in Embodiment 1.

A case where peak value Vp in the amount of variation in the attitude of vehicle 2 is low will first be described with reference to part (a) in FIG. 9. When peak value Vp is low, the variation in the movement of head 31 caused by the vibration is small regardless of the sitting height. In other words, as shown in part (a) in FIG. 9, a correlation in which the data groups from first data group A1 to third data group A3 are compressed to the left side is shown.

A case where peak value Vp in the amount of variation in the attitude of vehicle 2 is medium, that is, a case where peak value Vp is not as low as in part (a) in FIG. 9 but is not as high as in part (c) in FIG. 9 which will be described later will then be described with reference to part (b) in FIG. 9. The correlation of this case is, for example, the same as in FIG. 5, and the correlation in which the data groups are extended to the right side as compared with part (a) in FIG. 9 is shown.

A case where peak value Vp in the amount of variation in the attitude of vehicle 2 is higher than peak value Vp in part (b) in FIG. 9 will then be described with reference to part (c) in FIG. 9. When peak value Vp is high, the variation in the movement of head 31 caused by the vibration is large regardless of the sitting height. In other words, as shown in part (c) in FIG. 9, a correlation in which the data groups from first data group A1 to third data group A3 are displaced to the right side and are extended to the right side is shown.

In these figures, for example, for occupants 3 in first data group A1 whose sitting heights are low, threshold values Tdn (n=1 to 9) for delay time Td until the same drowsiness level L1 is reached are threshold value Td1 in part (a) in FIG. 9, threshold value Td4 in part (b) in FIG. 9, and threshold value Td7 in part (c) in FIG. 9. As is clear from these figures, a relationship of threshold values Tdn is Td1<Td4<Td7. Hence, it is found that for occupants 3 whose sitting heights are the same, threshold values Tdn differ from each other depending on the magnitude of peak value Vp, and as peak value Vp is higher, threshold value Tdn is higher. Likewise, for occupants 3 whose sitting heights are in second data group A2, a relationship of threshold values Tdn for delay time Td is Td2<Td5<Td8, and for occupants 3 whose sitting heights are in third data group A3, a relationship of threshold values Tdn for delay time Td is Td3<Td6<Td9.

Hence, in Embodiment 3, determiner 14 stores the correlations in parts (a) to (c) in FIG. 9 in an unillustrated memory, selects any one of the correlations in parts (a) to (c) in FIG. 9 according to peak value Vp, and thereby determines threshold value Tdn. As described above, with consideration given to the influence of peak value Vp on delay time Td, threshold value Tdn is determined, with the result that an error in delay time Td can be corrected.

Although here, three data groups for the sitting height are provided, and high, medium, and low peak values Vp in three stages are also provided, the present disclosure is not limited to this configuration. For each of the data group and peak value Vp, a larger number of stages may be provided or two stages may be provided. In this case, the maximum value of n in threshold values Tdn is different from 9.

Figure 10:
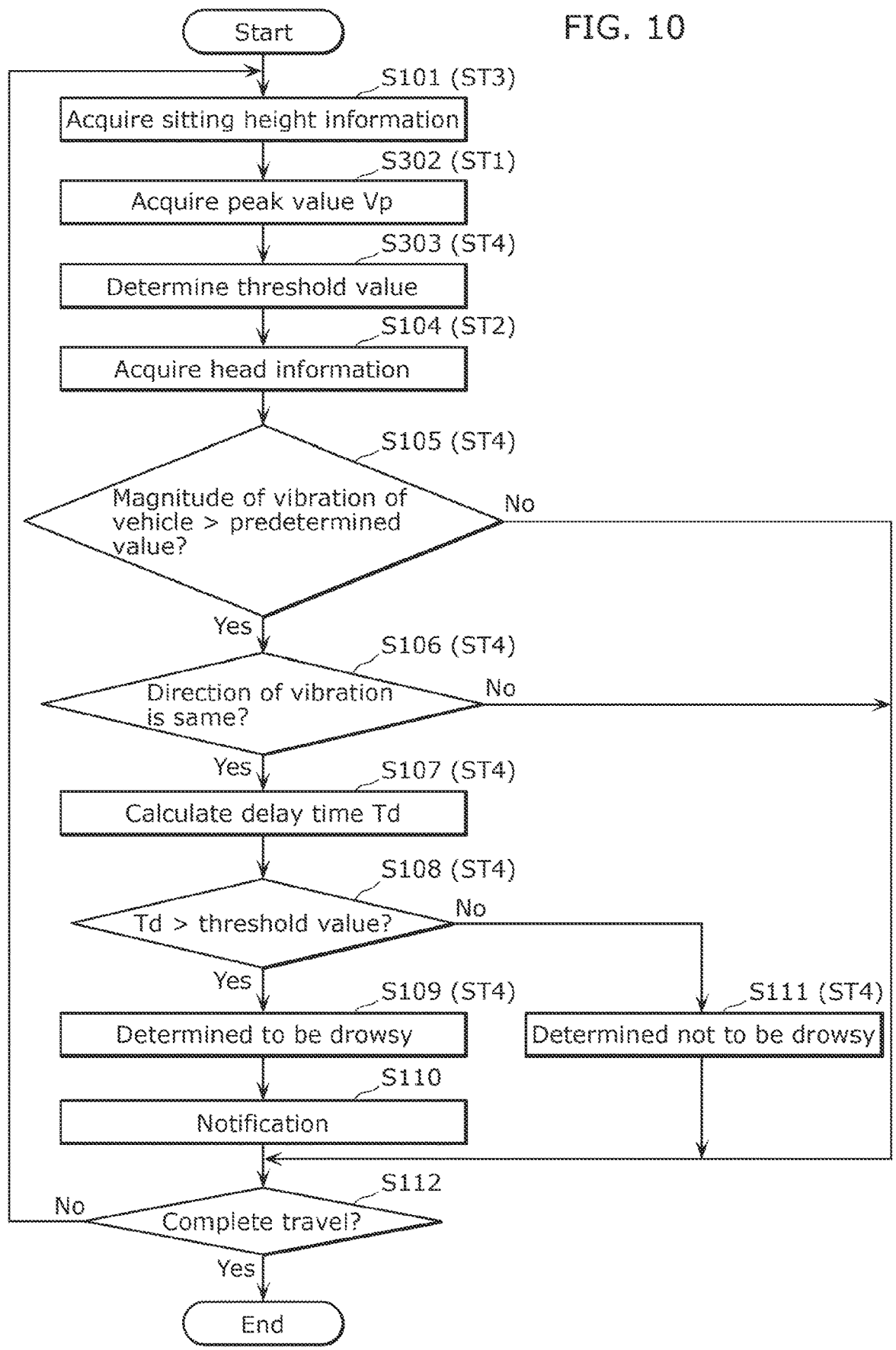
FIG. 10 is a flowchart showing an example of an operation of the drowsiness determination system in Embodiment 3.

A specific operation will then be described with reference to FIG. 10. FIG. 10 is a flowchart showing an example of the operation of the drowsiness determination system in Embodiment 3. In FIG. the same operations as in FIG. 6 in Embodiment 1 are identified with the same step numbers, and detailed description thereof is omitted.

First, an operation (S101) of acquiring the sitting height information by third acquirer 13 is the same as in FIG. 6. In this way, determiner 14 determines which one of the data groups from first data group A1 to third data group A3 is used.

Then, based on the vibration information acquired by first acquirer 11 (which corresponds to first acquisition step ST1 in the drowsiness determination method), determiner 14 determines peak value Vp in the amount of variation in the attitude of vehicle 2 (S302). In processing S302, for example, the amounts of variation which are sequentially acquired by first acquirer 11 are compared, and when the current value is lower than the previous value, the previous value is used as peak value Vp.

Then, determiner 14 determines threshold value Tdn (n=1 to 9) from the data group determined based on processing S101 and peak value Vp determined in processing S302 (S303). Processing S303 corresponds to determination step ST4 in the drowsiness determination method.

A specific example of processing S303 will be described. For example, it is assumed that based on processing S101, the sitting height is relatively high from the sitting height information. In this case, determiner 14 determines that third data group A3 is used. It is assumed that in subsequent processing S302, peak value Vp is relatively high. In this case, a correlation between delay time Td and the drowsiness level is the correlation in part (c) in FIG. 9. Hence, determiner 14 references the correlation in part (c) in FIG. 9 from the memory. Here, when third data group A3 in part (c) in FIG. 9 is referenced, threshold value Td9 for delay time Td is determined.

The subsequent operations are the same as in FIG. 6 in Embodiment 1. However, the threshold value which is compared with delay time Td in processing S108 is threshold value Tdn (n=1 to 9) determined in processing S303.

Figure 11:
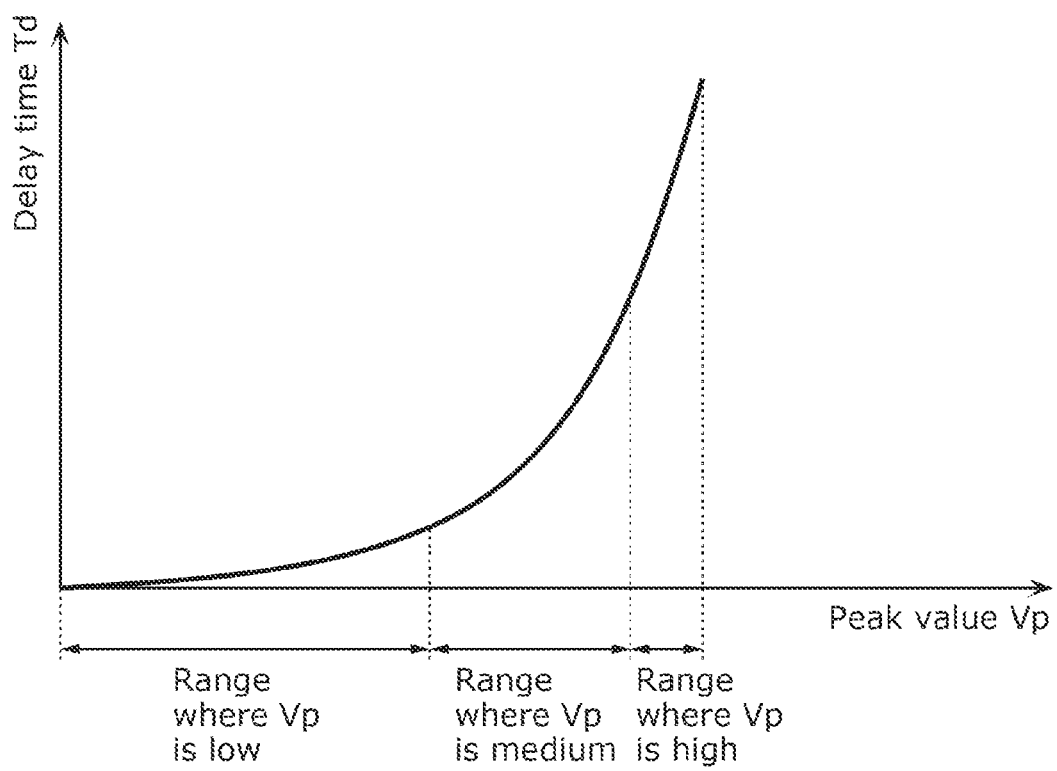
FIG. 11 is a correlation chart between a peak value in the amount of variation in the attitude of the vehicle and a delay time in the drowsiness determination system in Embodiment 3.

Although in the above description, the magnitude relationship of peak value Vp is simply set to three stages, that is, the case where peak value Vp is low, the case where peak value Vp is medium, and the case where peak value Vp is high, in peak value Vp (the magnitude of the vibration information), a range in which determiner 14 determines that peak value Vp is low may be broader than a range in which determiner 14 determines that peak value Vp is high. A specific description will be given with reference to FIG. 11. FIG. 11 is a correlation chart between peak value Vp in the amount of variation in the attitude of the vehicle and delay time Td in the drowsiness determination system in Embodiment 3. In FIG. 11, a horizontal axis represents peak value Vp, and a vertical axis represents delay time Td.

As shown in FIG. 11, when in an arbitrary sitting height, peak value Vp caused by the vibration of vehicle 2 is increased, delay time Td for the movement of head 31 is increased. However, a relationship therebetween is often nonlinear. Specifically, when peak value Vp is low, even if peak value Vp is increased, delay time Td is not significantly changed but when peak value Vp is high, delay time Td is sharply increased. Hence, when the magnitude relationship of peak value Vp is determined, as shown in FIG. 11, the range in which determiner 14 determines that peak value Vp is low may be broader than the range in which determiner 14 determines that peak value Vp is high. In this way, the magnitude relationship of peak value Vp can be determined more practically, and thus accuracy for the final drowsiness determination can be enhanced.

<Functional Effects>

As described above, in the drowsiness determination system in Embodiment 3, determiner 14 further determines whether occupant 3 is drowsy based on the magnitude (peak value Vp) of the vibration information.

In this way, an error in delay time Td based on the magnitude (peak value Vp) of the vibration information of vehicle 2 can be corrected, and thus a more highly accurate drowsiness determination can be performed advantageously.

In the drowsiness determination system in Embodiment 3, when determiner 14 determines whether occupant 3 is drowsy based on the magnitude (peak value Vp) of the vibration information, the range in which the vibration information is determined to be small, that is, the range in which peak value Vp is low is broader than the range in which the vibration information is determined to be large, that is, the range in which peak value Vp is high.

In this way, delay time Td for the movement of head 31 in the actual vibration of vehicle 2 does not significantly differ when the vibration of vehicle 2 is small, and as the vibration of vehicle 2 is increased, delay time Td is sharply increased. Hence, with consideration given to the nonlinear behavior as described above, the magnitude (peak value Vp) of the vibration information can be determined, with the result that a more highly accurate drowsiness determination can be performed advantageously.

In the drowsiness determination method in Embodiment 3, in the determination step, whether occupant 3 is drowsy is determined based further on the magnitude (peak value Vp) of the vibration information.

In this way, an error in delay time Td based on the magnitude (peak value Vp) of the vibration information of vehicle 2 can be corrected, and thus a more highly accurate drowsiness determination can be performed advantageously.

The configuration of Embodiment 3 may be applied to the configuration in which determination model 141 in Embodiment 2 is used. In this case, determination model 141 may be a model which has undergone machine learning so as to output the result of a determination when the vibration information including the magnitude (peak value Vp) of the vibration information of vehicle 2 and the head information are input.

Embodiment 4

A drowsiness determination system in Embodiment 4 differs from the drowsiness determination system in Embodiment 3 in that determiner 14 further determines representative value Pe of an eyelid position of occupant 3 in a predefined period from the information of head 31 based on the image obtained by imaging head 31, and determines whether occupant 3 is drowsy with consideration given to representative value Pe of the eyelid position. In the following description, representative value Pe of the eyelid position of occupant 3 in the predefined period is assumed to be an average eyelid position of occupant 3 in the predefined period. The configuration of the drowsiness determination system in Embodiment 4 is the same as drowsiness determination system 100 in Embodiment 1 shown in FIG. 1. Only differences from the drowsiness determination system in Embodiment 3 will be mainly described below, and the description of points common to the drowsiness determination systems in Embodiments 1 and 3 is omitted.

<Operation>

Figure 12:
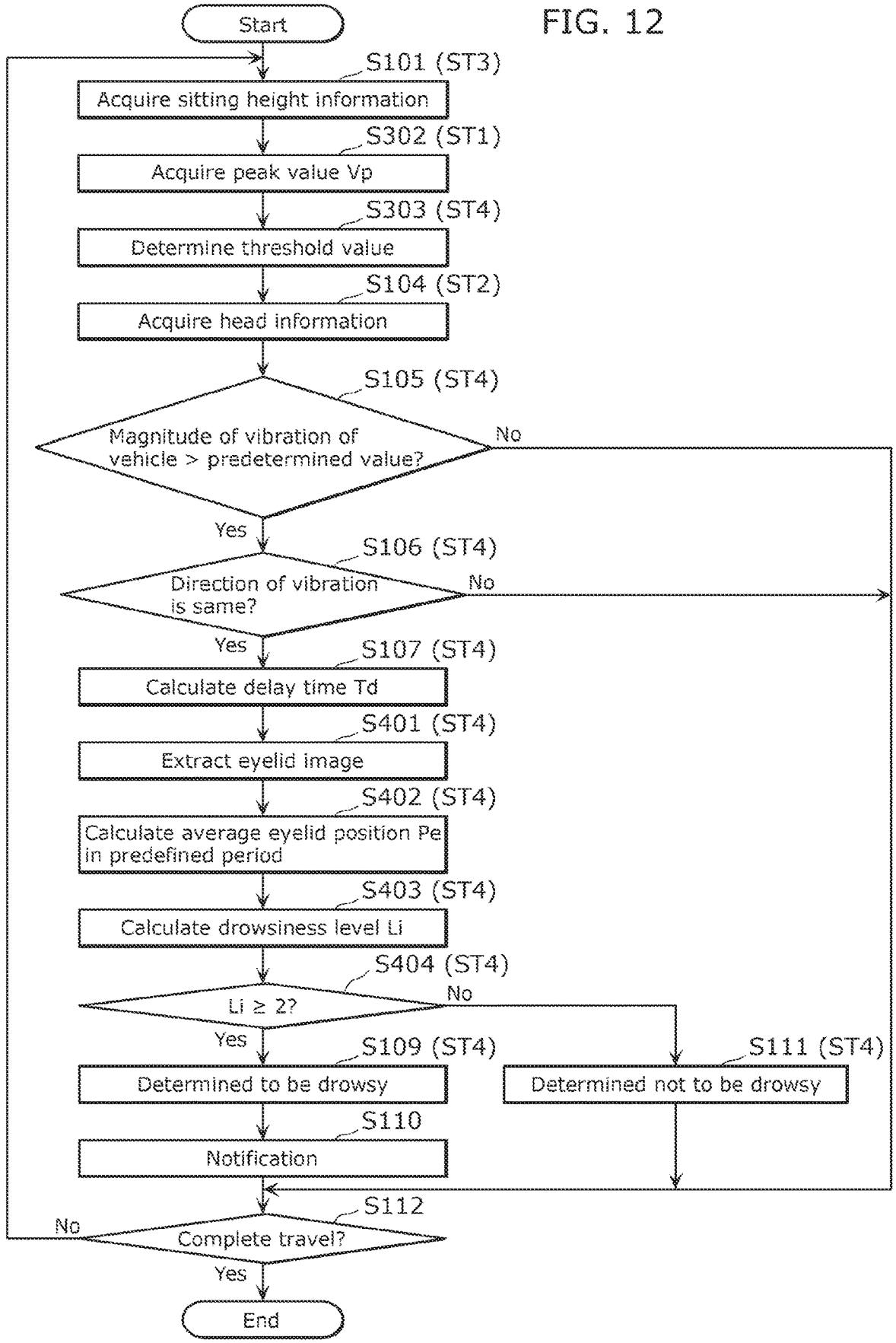
FIG. 12 is a flowchart showing an example of an operation of a drowsiness determination system in Embodiment 4.

FIG. 12 is a flowchart showing an example of the operation of the drowsiness determination system in Embodiment 4. In FIG. 12, the same operations as in FIG. 10 in Embodiment 3 are identified with the same step numbers, and detailed description thereof is omitted.

Processing S101 to S107 is first the same as in FIG. 10.

Then, determiner 14 extracts an eyelid image from the image of head 31 of occupant 3 acquired with camera 22 by second acquirer 12 (S401). Processing S401 corresponds to determination step ST4 in the drowsiness determination method.

Then, determiner 14 calculates average eyelid position Pe obtained by averaging the eyelid positions in the predefined period (S402). Specifically, the predefined period is set to, for example, 1 second, and determiner 14 determines the eyelid position from the image, for example, every 0.1 seconds to average the eyelid positions. The eyelid position is defined as the degree of eye opening, for example, with the assumption that when the eye is open, the degree of eye opening is 100% and when the eye is closed, the degree of eye opening is 0%. Processing S402 corresponds to determination step ST4 in the drowsiness determination method.

Then, determiner 14 first determines head drowsiness LTd determined based on delay time Td determined in processing S107. As described in "Other variations" above, head drowsiness LTd is obtained by determining, based on delay time Td, the drowsiness of occupant 3 by the five drowsiness levels of "level 1" to "level 5". The method of the determination is as described previously. Consequently, head drowsiness LTd is one numerical value of 1 to 5.

Likewise, determiner 14 determines eyelid drowsiness LPe based on average eyelid position Pe determined in processing S402. For eyelid drowsiness LPe, a correlation is previously prepared in which when average eyelid position Pe is a certain percent, the drowsiness level is one of 1 to 5. Hence, eyelid drowsiness LPe is also one numerical value of 1 to 5.

Then, determiner 14 assigns weights to head drowsiness LTd and eyelid drowsiness LPe to calculate final drowsiness level Li (S403). Processing S403 corresponds to determination step ST4 in the drowsiness determination method.

A specific example of drowsiness level Li will be described. For example, the weights are assigned to eyelid drowsiness LPe and head drowsiness LTd such that the influence of eyelid drowsiness LPe is 70% and the influence of head drowsiness LTd is 30% relative to final drowsiness level Li. The weighting coefficients (%) described above are previously determined by experiment or the like. In this way, a function for determining drowsiness L is defined as $L=0.7*LPe+0.3*LTd$. Drowsiness L is determined by substituting head drowsiness LTd and eyelid drowsiness LPe into this formula. However, since drowsiness L is a numerical value which includes digits after the decimal point, drowsiness level Li (numerical value of 1 to 5) can be calculated by rounding off the digits after the decimal point of drowsiness L. In this way, drowsiness level Li is calculated, and thus the direct influence of eyelid drowsiness LPe indicating drowsiness on drowsiness level Li is increased, with the result that the accuracy of the drowsiness determination is further increased.

Then, determiner 14 determines whether drowsiness level Li is greater than or equal to 2 (S404). Processing S404 corresponds to determination step ST4 in the drowsiness determination method. When drowsiness level Li is greater than or equal to 2, occupant 3 is drowsy with early drowsiness being included, with the result that the operation proceeds to processing S109. On the other hand, when drowsiness level Li is less than 2, that is, 1, occupant 3 is not drowsy, with the result that the operation proceeds to processing S111. By the processing as described above, the drowsiness determination system which can provide notification for early drowsiness can be realized.

When occupant 3 is wearing eyeglasses, and thus it is difficult to identify the eyelid position, the weights may be changed. For example, when the type of eyeglasses is colored sunglasses or when the type of eyeglasses is eyeglasses which easily reflect external light, it may be difficult to identify the eyelid position. In a specific example, when determiner 14 determines from the image of camera 22 that occupant 3 is wearing colored sunglasses, determiner 14 uses a function in which the weight to eyelid drowsiness LPe is reduced and the weight to head drowsiness LTd is increased accordingly, and thereby determines drowsiness L. For example, the weights described above are reversed, and thus the function for determining drowsiness L is defined as $L=0.3*LPe+0.7*LTd$. In this way, an error in eyelid drowsiness LPe caused by the sunglasses can be covered by head drowsiness LTd, and thus the accuracy of the drowsiness determination can be increased. The same is true when determiner 14 determines that occupant 3 is wearing eyeglasses which easily reflect external light.

For changing of the weights for the sunglasses, determiner 14 may change the weight to eyelid drowsiness LPe according to the shade of the sunglasses recognized from the image of camera 22, that is, may low the weight to eyelid drowsiness LPe as the sunglasses are darker. In this way, the drowsiness determination is performed so as to reduce the influence of eyelid drowsiness LPe which is likely to be more unclear for darker sunglasses, with the result that the accuracy of the drowsiness determination can be increased.

The weighting coefficients described above are examples, and the function may be defined by using a correlation based on experiment or the like between the parameters of eyelid drowsiness LPe and head drowsiness LTd and drowsiness L. A correlation between eyelid drowsiness LPe and head drowsiness LTd and drowsiness level Li determined by experiment or the like may be stored as a table in the memory.

<Functional Effects>

As described above, in the drowsiness determination system in Embodiment 4, determiner 14 further determines representative value Pe of the eyelid position of occupant 3 in the predefined period from the head information based on the image obtained by imaging head 31, and determines whether occupant 3 is drowsy with consideration given to representative value Pe of the eyelid position.

In this way, representative value Pe of the eyelid position is also used for the drowsiness determination, and thus a more highly accurate drowsiness determination can be performed advantageously.

In the drowsiness determination system in Embodiment 4, determiner 14 determines head drowsiness LTd and eyelid drowsiness LPe, and determines whether occupant 3 is drowsy by assigning weights to head drowsiness LTd and eyelid drowsiness LPe, the head drowsiness being determined based on the head information and the sitting height information, the eyelid drowsiness being determined based on representative value Pe of the eyelid position.

In this way, for example, the weight to eyelid drowsiness LPe indicating the direct drowsiness is increased as compared with head drowsiness LTd, and thus it is possible to increase the influence of eyelid drowsiness LPe on drowsiness L as a whole, with the result that the accuracy of the drowsiness determination is further increased advantageously.

In the drowsiness determination system in Embodiment 4, determiner 14 determines whether occupant 3 is wearing eyeglasses based on the head information, when occupant 3 is wearing the eyeglasses, determiner 14 determines the type of the eyeglasses, and determiner 14 determines whether the occupant is drowsy by assigning weights to head drowsiness LTd and eyelid drowsiness LPe according to the result of determining the type of the eyeglasses.

In this way, whether the occupant is wearing eyeglasses and an error in eyelid drowsiness LPe caused by the type of eyeglasses when the occupant is wearing eyeglasses can be covered by head drowsiness LTd, with the result that the accuracy of the drowsiness determination is increased advantageously.

In the drowsiness determination system in Embodiment 4, when occupant 3 is not wearing sunglasses, determiner 14 assigns a greater weight to eyelid drowsiness LPe relative to head drowsiness LTd, and when occupant 3 is wearing the sunglasses, determiner 14 assigns a less weight to eyelid drowsiness LPe relative to head drowsiness LTd.

In this way, an error in eyelid drowsiness LPe caused by sunglasses can be covered by head drowsiness LTd, with the result that the accuracy of the drowsiness determination is increased advantageously.

In the drowsiness determination method in Embodiment 4, the determination step further includes determining representative value Pe of the eyelid position of occupant 3 in the predefined period from the head information based on the image obtained by imaging head 31, and determining whether occupant 3 is drowsy with consideration given to representative value Pe of the eyelid position.

In this way, representative value Pe of the eyelid position is also used for the drowsiness determination, and thus a more highly accurate drowsiness determination can be performed advantageously.

Although in Embodiment 3, representative value Pe of the eyelid position of occupant 3 in the predefined period is the average eyelid position of occupant 3 in the predefined period, the present disclosure is not limited to this configuration. For example, representative value Pe may be a central value, a mode value, or the like of the eyelid position of occupant 3 in the predefined period.

Although in Embodiment 4, whether occupant 3 is drowsy is determined with consideration given to representative value Pe of the eyelid position based on the configuration of Embodiment 3, the present disclosure is not limited to this configuration. For example, the configuration of Embodiment 4 may be applied to Embodiment 1 or 2.

(Variations)

Although the drowsiness determination system according to the present disclosure has been described based on Embodiments 1 to 4, the present disclosure is not limited to Embodiments 1 to 4. Embodiments obtained by performing, on the embodiments, various variations conceivable by a person skilled in the art may be included in the scope of the present disclosure without departing from the spirit of the present disclosure.

Although in each of the embodiments described above, the direction of the vibration of vehicle 2 is the pitch direction relative to the road surface, the present disclosure is not limited to this configuration. For example, the direction of the vibration of vehicle 2 may be a roll direction or a yaw direction relative to the road surface.

Units which are included in the drowsiness determination system according to each of the embodiments described above are typically realized as LSI circuits which are integrated circuits. Each of them may be formed into one chip or a part or all of them may be formed into one chip.

Circuit integration is not limited to LSI, and may be realized by a dedicated circuit or a general-purpose processor. A field programmable gate array (FPGA) which can be programmed after an LSI circuit is manufactured or a reconfigurable processor which can reconfigure the connection and setting of circuit cells inside an LSI circuit may be utilized.

In each of the embodiments described above, constituent elements may be formed by dedicated hardware or may be realized by executing a software program suitable for each of the constituent elements. A program executor such as a CPU or a processor may read and execute a software program recorded in a recording medium such as a hard disk drive or a semiconductor memory so as to realize each of the constituent elements.

All the numbers used above are examples for specifically describing the present disclosure, and the embodiments of the present disclosure are not limited to the numbers described as examples.

The division of functional blocks in each of the block diagrams is an example, and a plurality of functional blocks may be realized as a single functional block, a single functional block may be divided into a plurality of functional blocks, or some functions may be transferred to other functional blocks. A single piece of hardware or software may process the functions of a plurality of functional blocks having similar functions in parallel or in a time division manner.

The order in which steps in each of the flowcharts are performed is an example for specifically describing the present disclosure, and an order other than the order described above may be used. A part of the steps may be performed simultaneously (in parallel) with other steps.

Embodiments obtained by performing, on the embodiments, various variations conceivable by a person skilled in the art and embodiments realized by arbitrarily combining the constituent elements and the functions in the embodiments without departing from the spirit of the present disclosure may be included in the scope of the present disclosure.

Further Information about Technical Background to this Application

The disclosures of the following patent applications including specification, drawings, and claims are incorporated herein by reference in their entirety: Japanese Patent Application No. 2021-047820 filed on Mar. 22, 2021, and Japanese Patent Application No. 2021-124177 filed on Jul. 29, 2021, and PCT International Application No. PCT/JP2022/000177 filed on Jan. 6, 2022.

INDUSTRIAL APPLICABILITY

The present disclosure can be utilized in a system for assisting the driving of a vehicle, for example, in a moving body such as a vehicle.

The invention claimed is:

1. A drowsiness determination system comprising:
a circuit configured to:
acquire vibration information indicating vibration of a vehicle;
acquire head information indicating a variation in movement of a head of an occupant;
acquire sitting height information indicating a sitting height of the occupant; and
determine whether the occupant is drowsy based on the head information and the sitting height information, when the vibration information indicates occurrence of the vibration of the vehicle,
wherein the circuit compares the head information and a threshold value to determine whether the occupant is drowsy, and
the circuit determines the threshold value from a plurality of threshold value candidates based on the sitting height information.

2. The drowsiness determination system according to claim 1,
wherein the circuit estimates the sitting height based on an image obtained by imaging the head to acquire the sitting height information.

3. The drowsiness determination system according to claim 1,
wherein the head information includes at least one of
a delay time until the variation in the movement of the head occurs in a predetermined period after a time at which the vibration of the vehicle occurs,
a maximum value of an amplitude of the variation in the movement of the head relative to a predetermined position in the predetermined period,
an average value of the amplitude of the variation in the movement of the head relative to the predetermined position in the predetermined period, or
a dispersion of positions of the head relative to the predetermined position in the predetermined period.

4. The drowsiness determination system according to claim 3,
wherein the circuit resets a measurement of the predetermined period when the predetermined period elapses or when magnitude of the vibration of the vehicle exceeds a predetermined value.

5. The drowsiness determination system according to claim 4,
wherein the circuit does not determine whether the occupant is drowsy until the magnitude of the vibration of the vehicle exceeds the predetermined value after the measurement of the predetermined period is reset.

6. The drowsiness determination system according to claim 1,
wherein the circuit decelerates the vehicle when the vibration of the vehicle does not occur for a predetermined time or more.

7. The drowsiness determination system according to claim 1,
wherein the circuit further determines whether the occupant is drowsy based on magnitude of the vibration information.

8. The drowsiness determination system according to claim 7,
wherein when the circuit determines whether the occupant is drowsy based on the magnitude of the vibration information, a range in which the vibration information is determined to be small is wider than a range in which the vibration information is determined to be large.

9. The drowsiness determination system according to claim 1,
wherein the circuit further determines a representative value of an eyelid position of the occupant in a predefined period from the head information based on an image obtained by imaging the head, and determines whether the occupant is drowsy with consideration given to the representative value of the eyelid position.

10. The drowsiness determination system according to claim 9, wherein the circuit determines head drowsiness and eyelid drowsiness, and determines whether the occupant is drowsy by assigning weights to the head drowsiness and the eyelid drowsiness, the head drowsiness being determined based on the head information and the sitting height information, the eyelid drowsiness being determined based on the representative value of the eyelid position.

11. The drowsiness determination system according to claim 10,
wherein the circuit determines whether the occupant is wearing eyeglasses based on the head information,
when the occupant is wearing the eyeglasses, the circuit determines a type of the eyeglasses, and
the circuit determines whether the occupant is drowsy by assigning weights to the head drowsiness and the eyelid drowsiness according to a result of determining the type of the eyeglasses.

12. The drowsiness determination system according to claim 11,
wherein when the occupant is not wearing sunglasses, the circuit assigns a greater weight to the eyelid drowsiness relative to the head drowsiness, and
when the occupant is wearing the sunglasses, the circuit assigns a less weight to the eyelid drowsiness relative to the head drowsiness.

13. A drowsiness determination method comprising:
acquiring vibration information indicating vibration of a vehicle;
acquiring head information indicating a variation in movement of a head of an occupant;
acquiring sitting height information indicating a sitting height of the occupant;
determining whether the occupant is drowsy based on the head information and the sitting height information, when the vibration information indicates occurrence of the vibration of the vehicle;
comparing the head information and a threshold value to determine whether the occupant is drowsy; and
determining the threshold value from a plurality of threshold value candidates based on the sitting height information.

14. The drowsiness determination method according to claim 13,
wherein whether the occupant is drowsy is determined based further on magnitude of the vibration information.

15. The drowsiness determination method according to claim 13, further comprising
determining a representative value of an eyelid position of the occupant in a predefined period from the head information based on an image obtained by imaging the head,
wherein whether the occupant is drowsy is determined with consideration given to the representative value of the eyelid position.

16. A drowsiness determination system comprising:
a circuit configured to:
acquire vibration information indicating vibration of a vehicle;
acquire head information indicating a variation in movement of a head of an occupant;
acquire sitting height information indicating a sitting height of the occupant; and
determine whether the occupant is drowsy based on the head information and the sitting height information, when the vibration information indicates occurrence of the vibration of the vehicle,
wherein the circuit includes a determination model into which the vibration information and the head information are input and which outputs a result of the determination of whether the occupant is drowsy, and
the circuit determines the determination model from a plurality of determination model candidates based on the sitting height information.

17. A drowsiness determination system comprising:
a circuit configured to:
acquire vibration information indicating vibration of a vehicle;
acquire head information indicating a variation in movement of a head of an occupant;
acquire sitting height information indicating a sitting height of the occupant; and
determine whether the occupant is drowsy based on the head information and the sitting height information, when the vibration information indicates occurrence of the vibration of the vehicle,
wherein the circuit further determines whether the occupant is drowsy based on magnitude of the vibration information, and
when the circuit determines whether the occupant is drowsy based on the magnitude of the vibration information, a range in which the vibration information is determined to be small is wider than a range in which the vibration information is determined to be large.

18. The drowsiness determination system according to claim 17,
wherein the circuit includes a determination model into which the vibration information and the head information are input and which outputs a result of the determination of whether the occupant is drowsy, and
the circuit determines the determination model from a plurality of determination model candidates based on the sitting height information.

* * * * *